(12) United States Patent
Yamagishi et al.

(10) Patent No.: US 10,985,450 B2
(45) Date of Patent: Apr. 20, 2021

(54) ANTENNA BUILT-IN TOUCH PANEL

(71) Applicant: SHARP KABUSHIKI KAISHA, Osaka (JP)

(72) Inventors: Shinji Yamagishi, Sakai (JP); Yasuhiro Sugita, Sakai (JP); Jean Mugiraneza, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 86 days.

(21) Appl. No.: 16/073,644

(22) PCT Filed: Jan. 27, 2017

(86) PCT No.: PCT/JP2017/002856
§ 371 (c)(1),
(2) Date: Jul. 27, 2018

(87) PCT Pub. No.: WO2017/131128
PCT Pub. Date: Aug. 3, 2017

(65) Prior Publication Data
US 2019/0036208 A1    Jan. 31, 2019

(30) Foreign Application Priority Data

Jan. 29, 2016   (JP) ............................. JP2016-015628

(51) Int. Cl.
*H01Q 1/38* (2006.01)
*H01Q 7/00* (2006.01)
(Continued)

(52) U.S. Cl.
CPC .............. *H01Q 1/38* (2013.01); *G06F 3/038* (2013.01); *G06F 3/046* (2013.01); *G06F 3/0445* (2019.05); *G06F 3/0446* (2019.05); *G06F 3/04162* (2019.05); *G06K 7/10297* (2013.01); *G06K 19/0723* (2013.01); *H01Q 1/2216* (2013.01);
(Continued)

(58) Field of Classification Search
CPC .......... H01Q 1/38; H01Q 1/2216; H01Q 7/00; G06F 3/046; G06K 7/10297; G06K 19/0723
See application file for complete search history.

(56) References Cited

U.S. PATENT DOCUMENTS 6,380,930 B1   4/2002  Van Ruymbeke
9,178,572 B1 * 11/2015  Zhang .................. H04B 5/0012
(Continued)

FOREIGN PATENT DOCUMENTS

| JP | 2002-539517 A | 11/2002 |
| JP | 2012-064123 A | 3/2012 |
| JP | 2013-540320 A | 10/2013 |

*Primary Examiner* — Graham P Smith
*Assistant Examiner* — Jae K Kim
(74) *Attorney, Agent, or Firm* — ScienBiziP, P.C.

(57) ABSTRACT

Provided is an antenna built-in touch panel that includes an antenna that reads information via near field wireless communication, and that has a small thickness. An antenna built-in touch panel includes: a touch panel; and an antenna that reads information via near field wireless communication, wherein the touch panel includes a first electrode layer and a second electrode layer, and antenna patterns 21*a* to 21*c* are provided in at least one of a sensing electrode layer and a drive electrode layer of the touch panel.

8 Claims, 24 Drawing Sheets

(51) Int. Cl.
*H01Q 1/22* (2006.01)
*H01Q 1/44* (2006.01)
*G06F 3/038* (2013.01)
*H04B 5/00* (2006.01)
*G06F 3/041* (2006.01)
*G06F 3/044* (2006.01)
*G06F 3/046* (2006.01)
*G06K 7/10* (2006.01)
*G06K 19/07* (2006.01)

(52) U.S. Cl.
CPC .............. *H01Q 1/44* (2013.01); *H01Q 7/00* (2013.01); *H04B 5/0081* (2013.01)

(56) References Cited

U.S. PATENT DOCUMENTS

| | | | |
|---|---|---|---|
| 2012/0086669 A1 | 4/2012 | Kim et al. | |
| 2012/0133597 A1* | 5/2012 | Chen | H01Q 1/2225 345/173 |
| 2014/0104157 A1* | 4/2014 | Burns | H01Q 1/44 345/156 |
| 2014/0106684 A1* | 4/2014 | Burns | H01Q 21/28 455/78 |
| 2014/0132529 A1* | 5/2014 | Jeong | G06F 3/03545 345/173 |
| 2016/0344089 A1* | 11/2016 | Baik | G04G 21/08 |
| 2017/0351355 A1* | 12/2017 | Hsieh | G06F 3/0412 |
| 2019/0237875 A1* | 8/2019 | Yamagishi | G06K 19/07749 |

\* cited by examiner

ANTENNA BUILT-IN TOUCH PANEL

TECHNICAL FIELD

The present invention relates to a touch pane includes an antenna for near field wireless communication.

BACKGROUND ART

In recent years, the following technique is often used: between an IC card (contactless IC card) that does not include a power source and incorporates an antenna element for wireless communication, and a communication device that includes a power source, near field communication is performed between the IC card and the communication device without the two being brought into contact with each other. For example, in a case where wireless communication (near field communication) is performed between a communication device and a contactless IC card, the contactless IC card is brought close to the communication device, to such an extent that the distance between the antenna element of the communication device and the contactless IC card is equal to or less than a predetermined distance. The communication device includes a power source, and power is supplied to the antenna element for near field wireless communication incorporated in the communication device, whereby a magnetic field is generated by the antenna element. Then, by the magnetic field generated by the communication device when the contactless IC card is brought close to the communication device, induced current is caused to flow through the antenna element of the contactless IC card. Thus, electric power can be supplied from the communication device to the contactless IC card. Then, the contactless IC card causes a circuit (for example, an IC chip) in the contactless IC card to operate, with use of the electromotive force generated by the induced current. In this way, by bringing a contactless IC card close to a communication device, wireless communication (near field communication) can be performed between the contactless IC card and the communication device.

Such an antenna device in which an antenna element is incorporated in a display terminal is disclosed in Patent Document 1. In the display terminal disclosed in Patent Document 1, when a touch operation is performed by an IC card with respect to the display area, data are transmitted/received between the display terminal and an IC card reader/writer via an antenna coil at the touch operation position, and at the same time, control corresponding to display contents displayed on the display terminal is performed in correspondence to the touch operation position.

PRIOR ART DOCUMENT

Patent Document

Patent Document 1: JP-A-2012-64123

SUMMARY OF THE INVENTION

Problem to be Solved by the Invention

The device disclosed in Patent Document 1 and the like includes a liquid crystal display terminal and a touch panel that are laminated, and antenna coils are provided in the liquid crystal display terminal. In a case where the touch panel and the antenna coils are formed in different layers in this way, the device as a whole unavoidably has a greater thickness.

In light of the above-described problem, it is an object of the present invention to make the antenna built-in touch panel thinner.

Means to Solve the Problem

To achieve the above-described object, an antenna built-in touch panel according to an embodiment of the present invention includes: a touch panel; and an antenna that reads information via near field wireless communication, wherein the touch panel includes a first electrode layer and a second electrode layer, and the antenna is provided in at least one of the first electrode layer and the second electrode layer of the touch panel.

Effect of the Invention

With the present invention, an antenna built-in touch panel having a smaller thickness can be provided.

Figure 8:
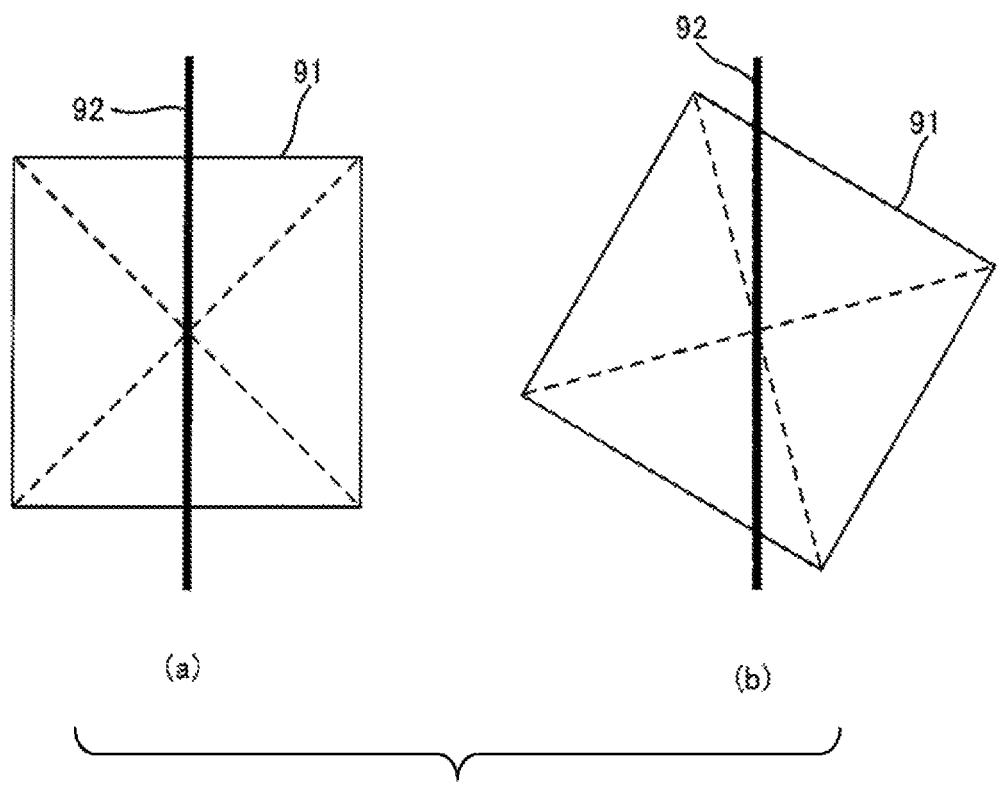

(a) and (b) of FIG. 8 schematically illustrate states where an IC card cannot be detected in a conventional antenna device.

Figure 9:
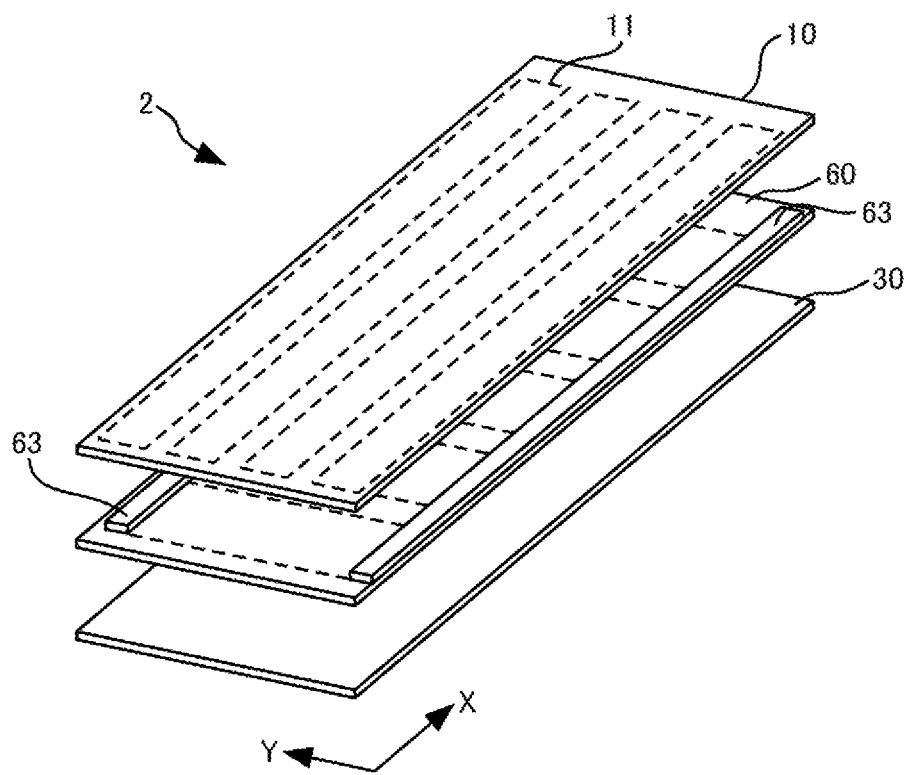

FIG. 9 is an exploded perspective view illustrating a schematic configuration of a touch panel in Embodiment 2.

Figure 10:
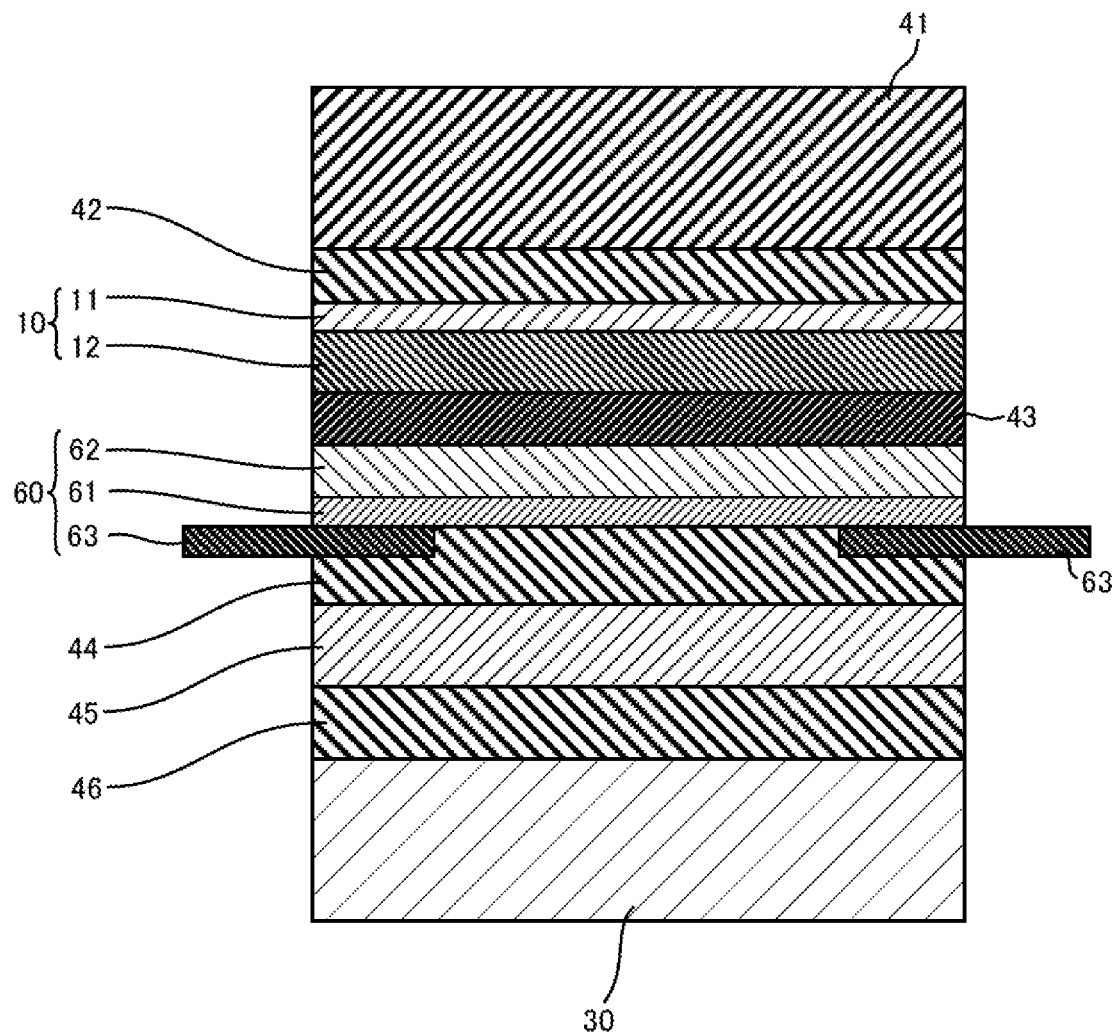

FIG. 10 is a cross-sectional view illustrating a state of the touch panel according to Embodiment 2, taken along a cross section parallel to the Y-Z plane.

Figure 11:
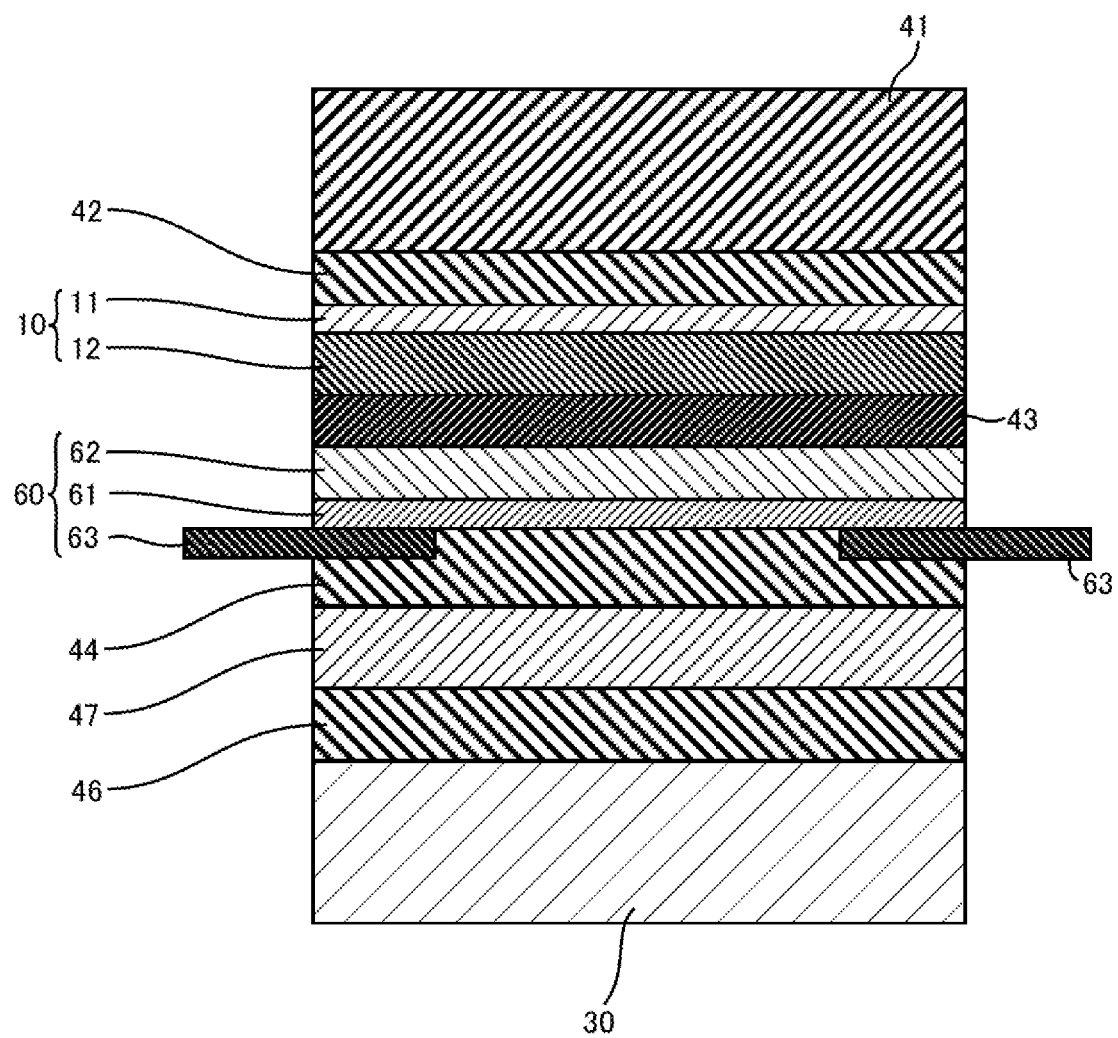

FIG. 11 is a cross-sectional view illustrating a state of a modification example of the touch panel according to Embodiment 2, taken along a cross section parallel to the Y-Z plane.

Figure 12:
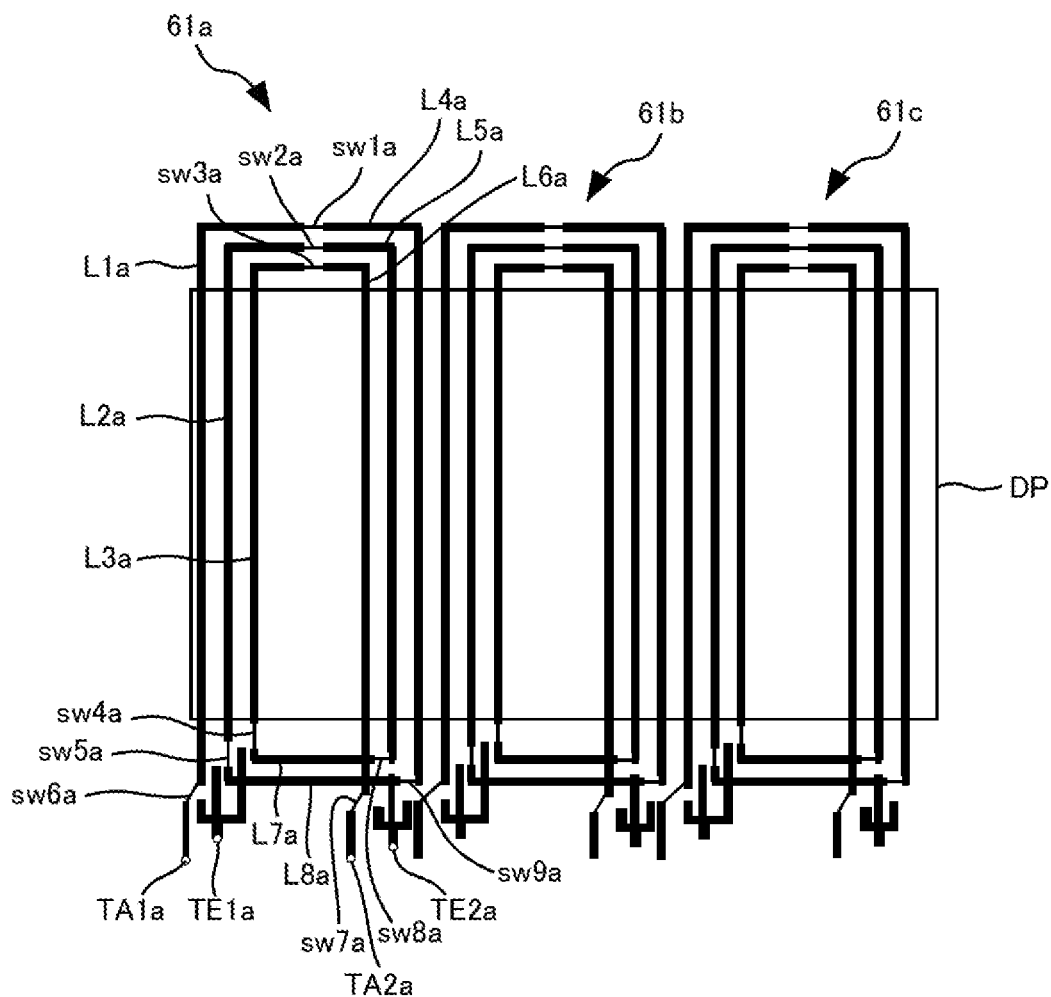

FIG. 12 is a circuit diagram illustrating a configuration in a case where electrode patterns in Embodiment 2 function as an antenna.

Figure 13:
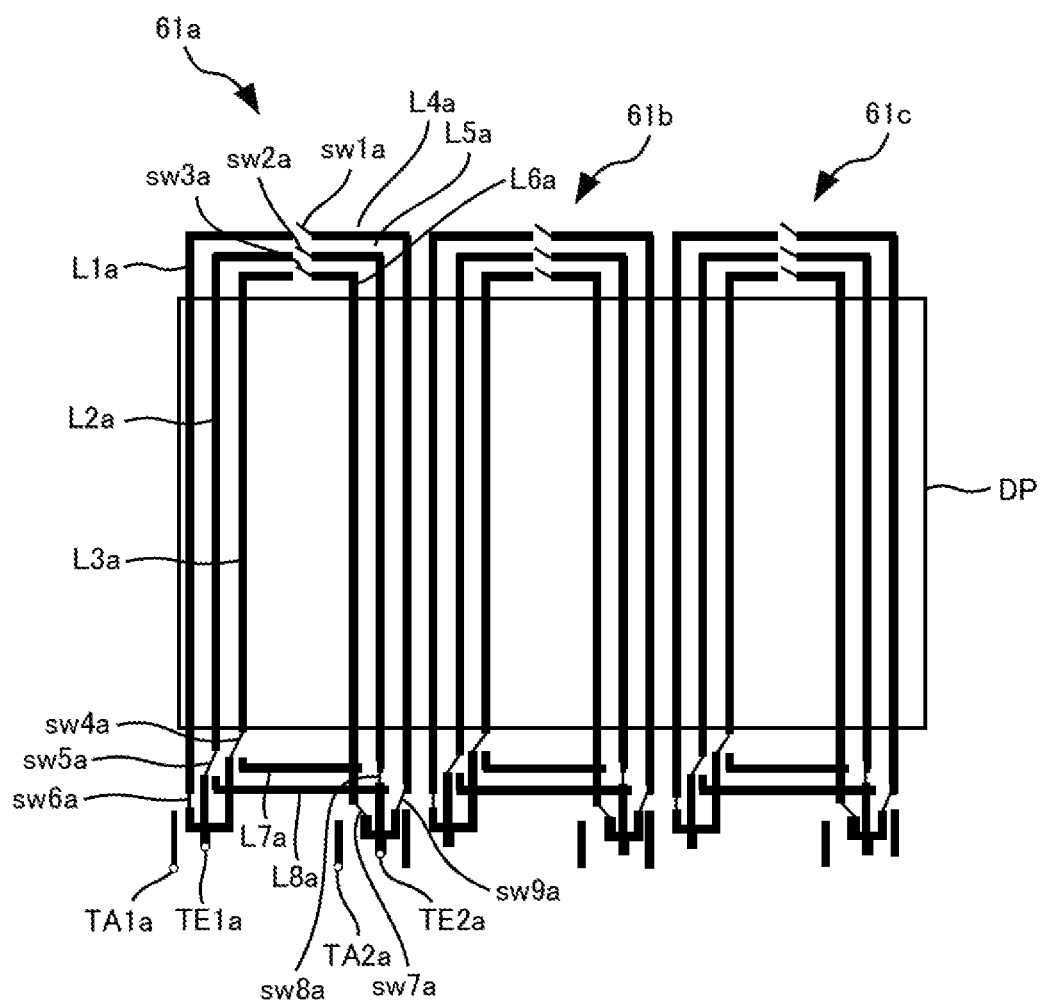

FIG. 13 is a circuit diagram illustrating a configuration in a case where the electrode patterns in Embodiment 2 function as electrodes of a touch panel.

Figure 14:
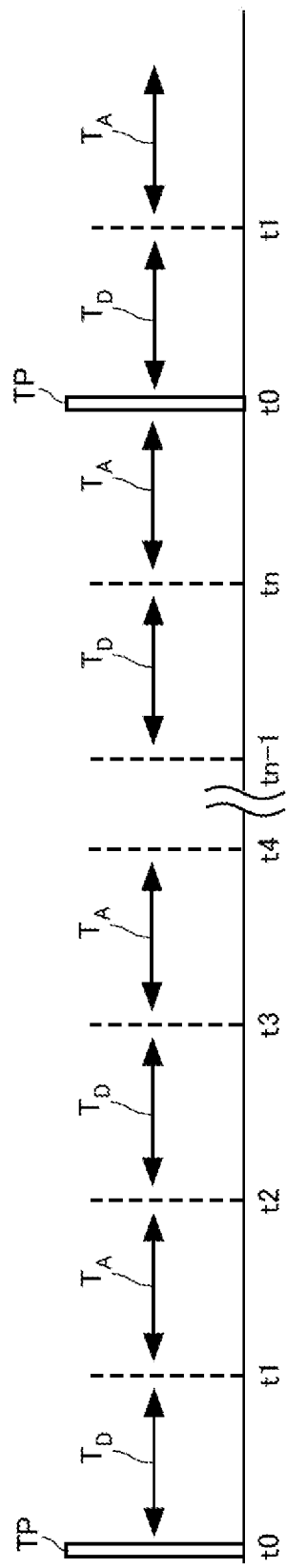

FIG. 14 is a time chart illustrating a method for driving the electrode patterns in Embodiment 2.

Figure 15:
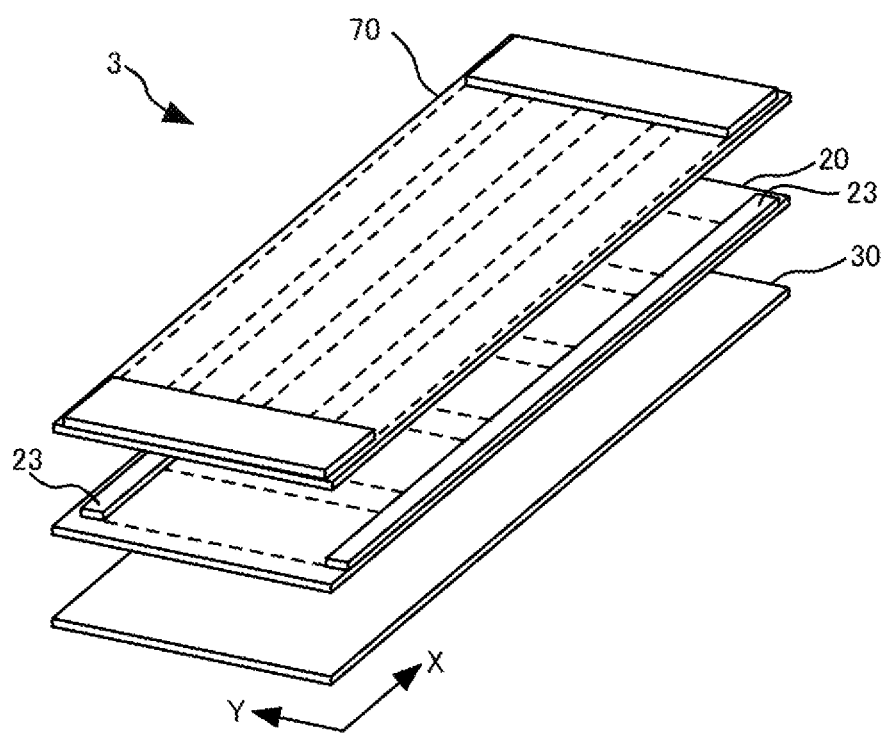

FIG. 15 is an exploded perspective view illustrating a schematic configuration of a touch panel in Embodiment 3.

Figure 16:
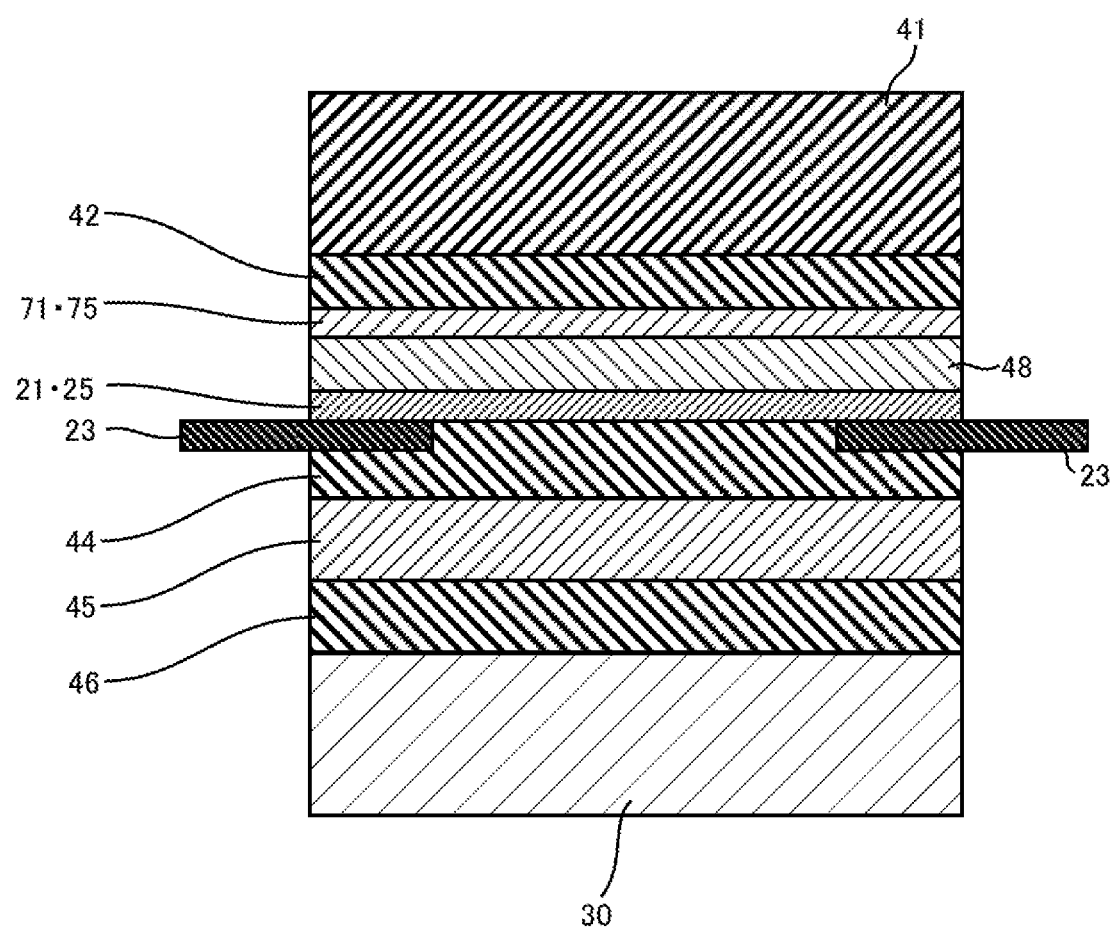

FIG. 16 is a cross-sectional view illustrating a state of the touch panel according to Embodiment 3, taken along a cross section parallel to the Y-Z plane.

Figure 17:
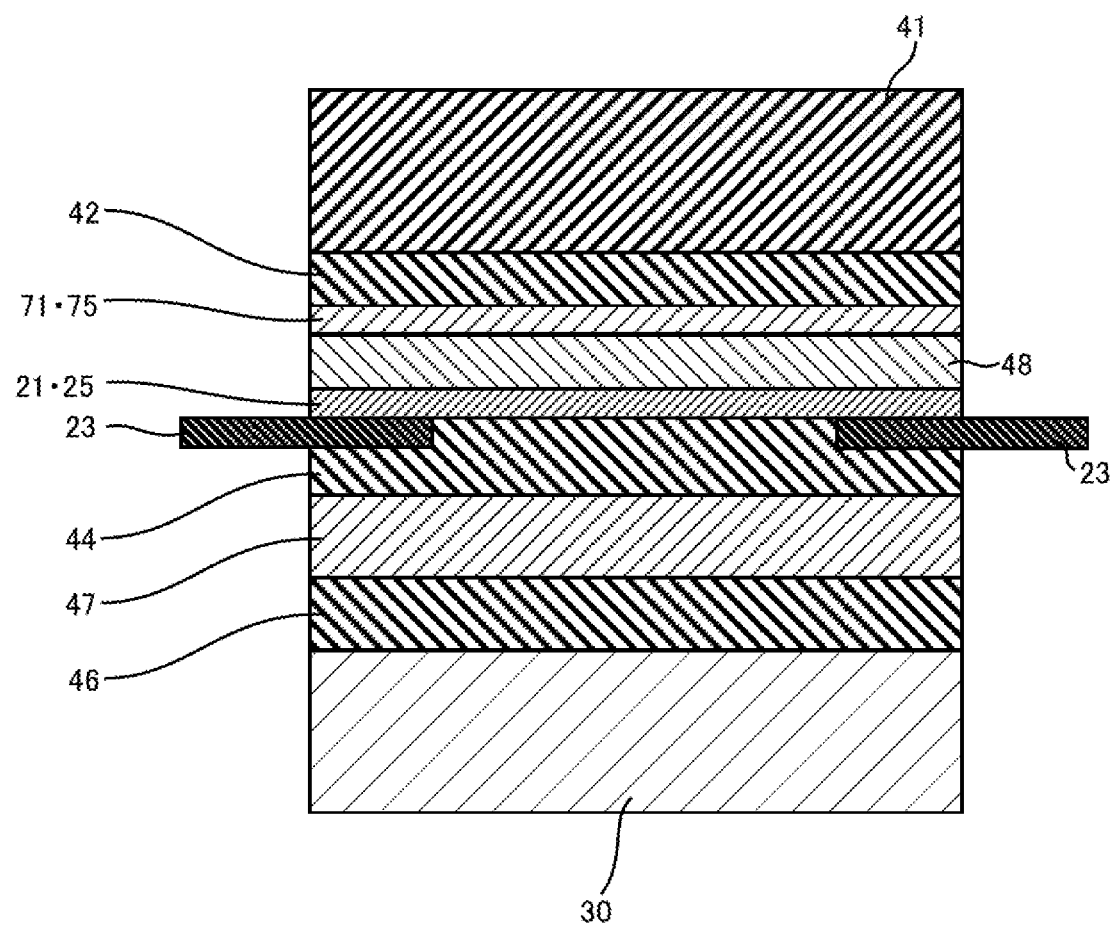

FIG. 17 is a cross-sectional view illustrating a state of a modification example of the touch panel according to Embodiment 3, taken along a cross section parallel to the Y-Z plane.

Figure 18:
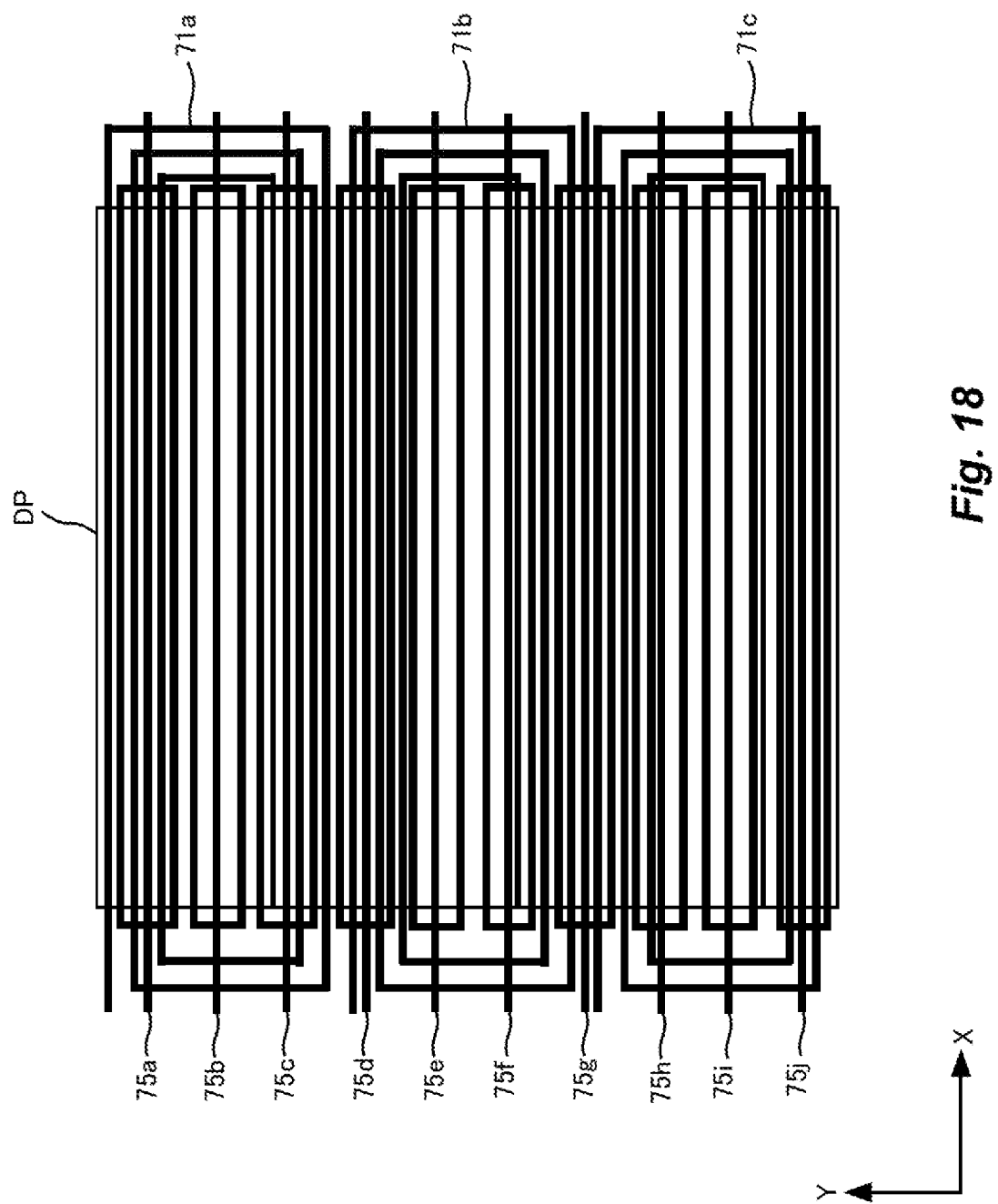

FIG. 18 is a schematic plan view schematically illustrating arrangement of sensing electrodes and antenna patterns.

Figure 19:
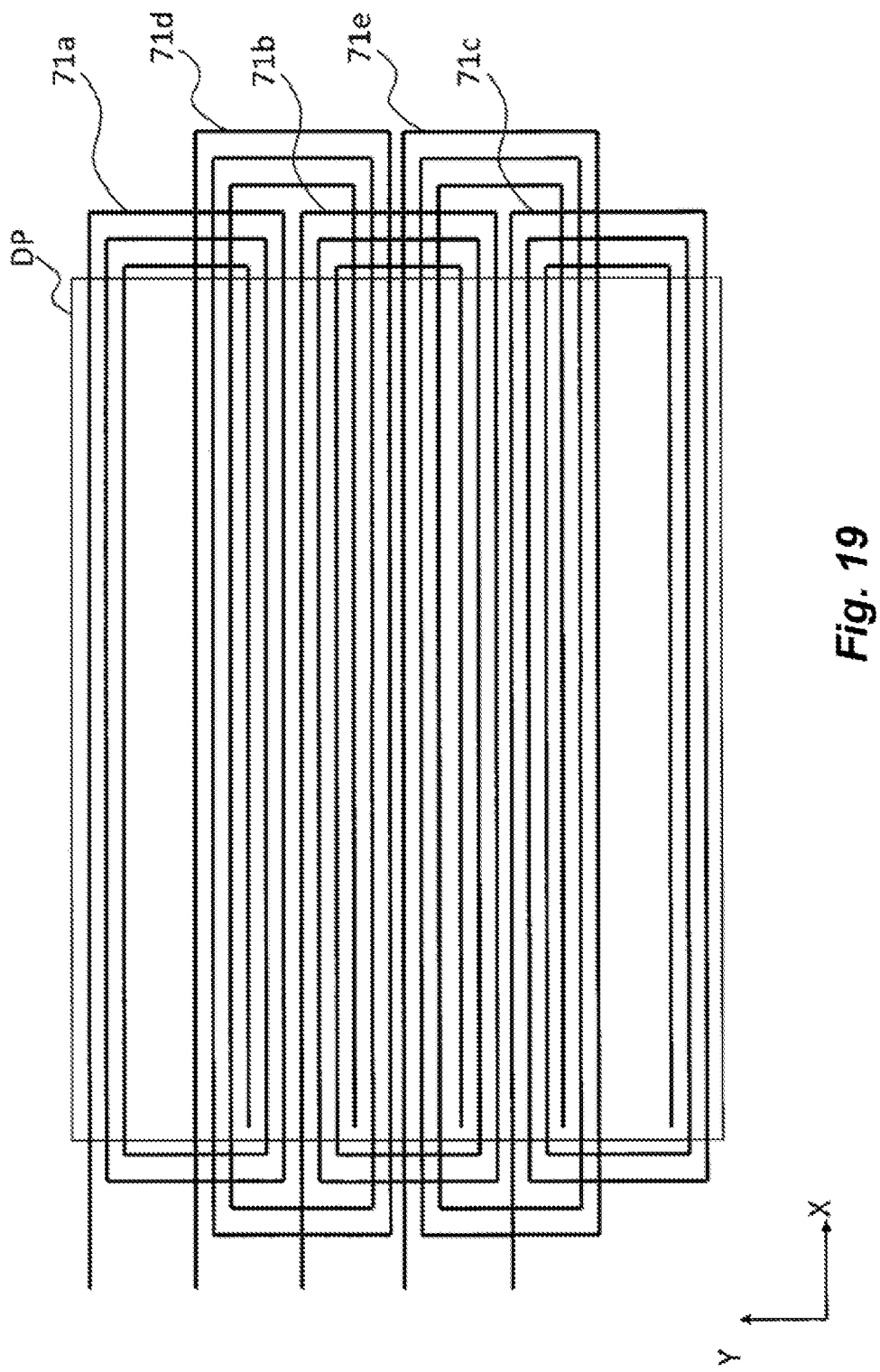

FIG. 19 is a schematic plan view schematically illustrating an arrangement of antenna patterns in a modification example of Embodiment 3.

Figure 20:
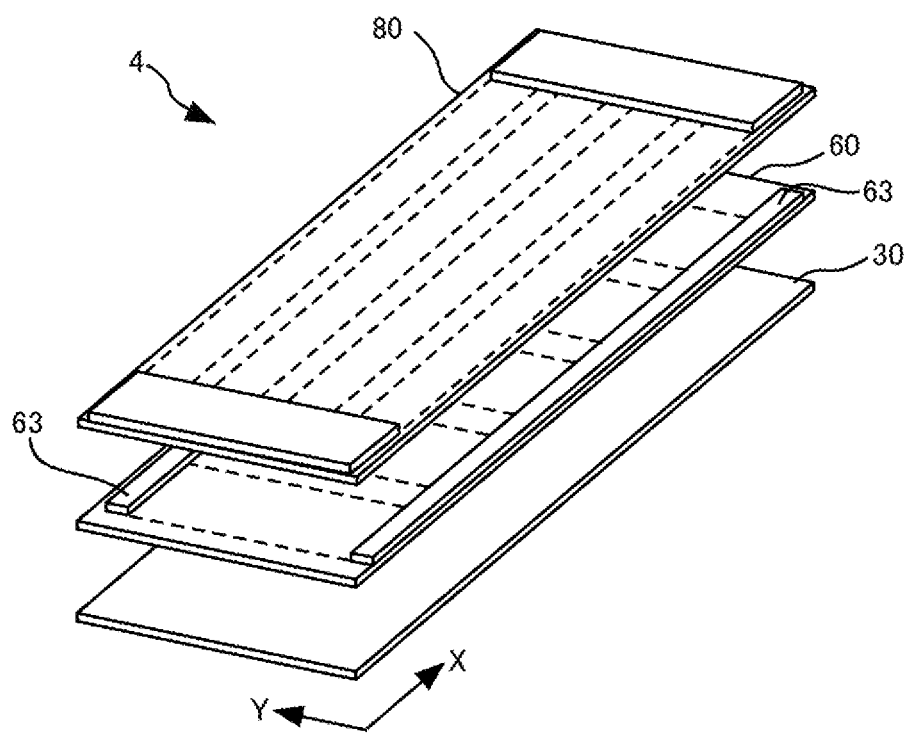

FIG. 20 is an exploded perspective view illustrating a schematic configuration of a touch panel in Embodiment 4.

Figure 21:
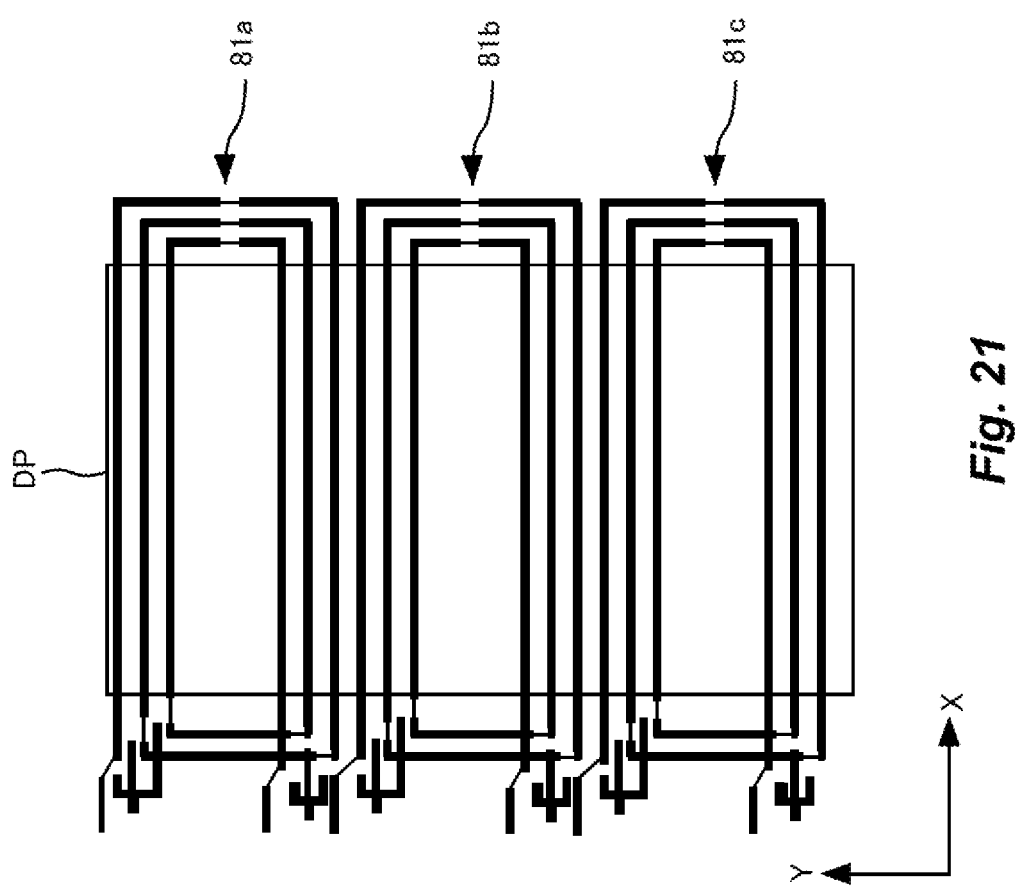

FIG. 21 is a circuit diagram illustrating a configuration in a case where electrode patterns in Embodiment 4 function as an antenna.

Figure 22:
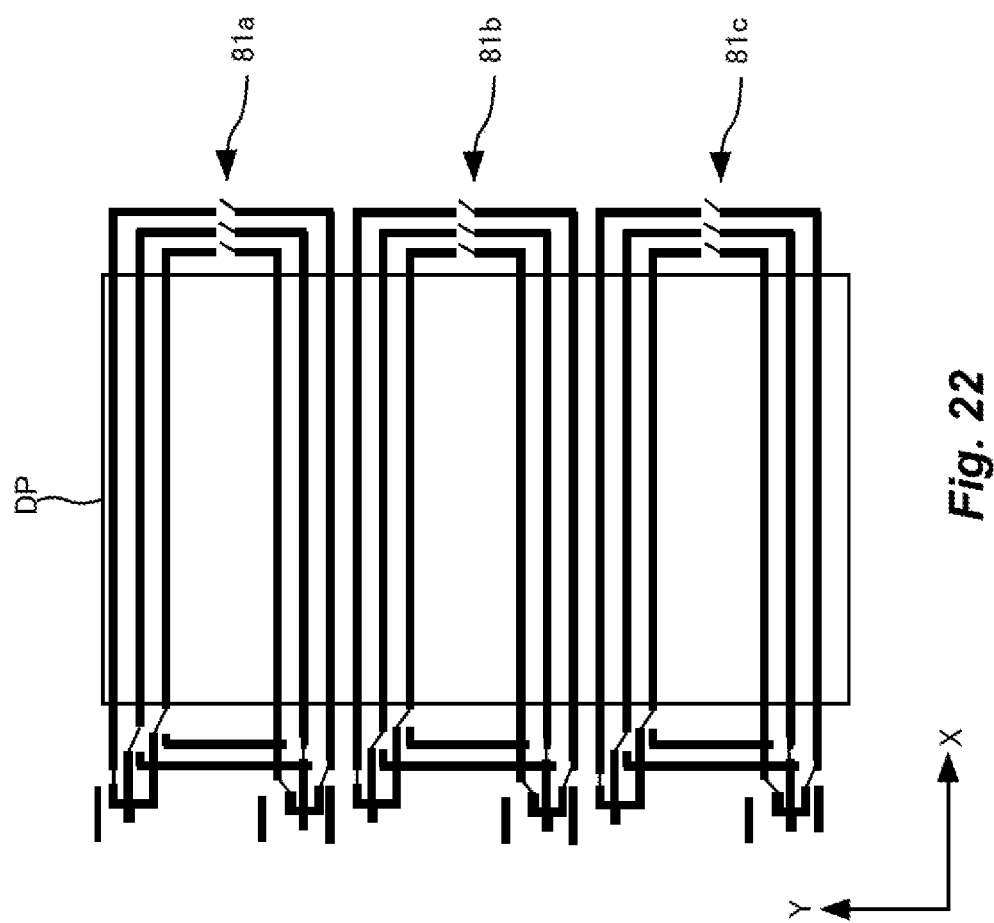

FIG. 22 is a circuit diagram illustrating a configuration in a case where the electrode patterns in Embodiment 4 function as electrodes of a touch panel.

Figure 23:
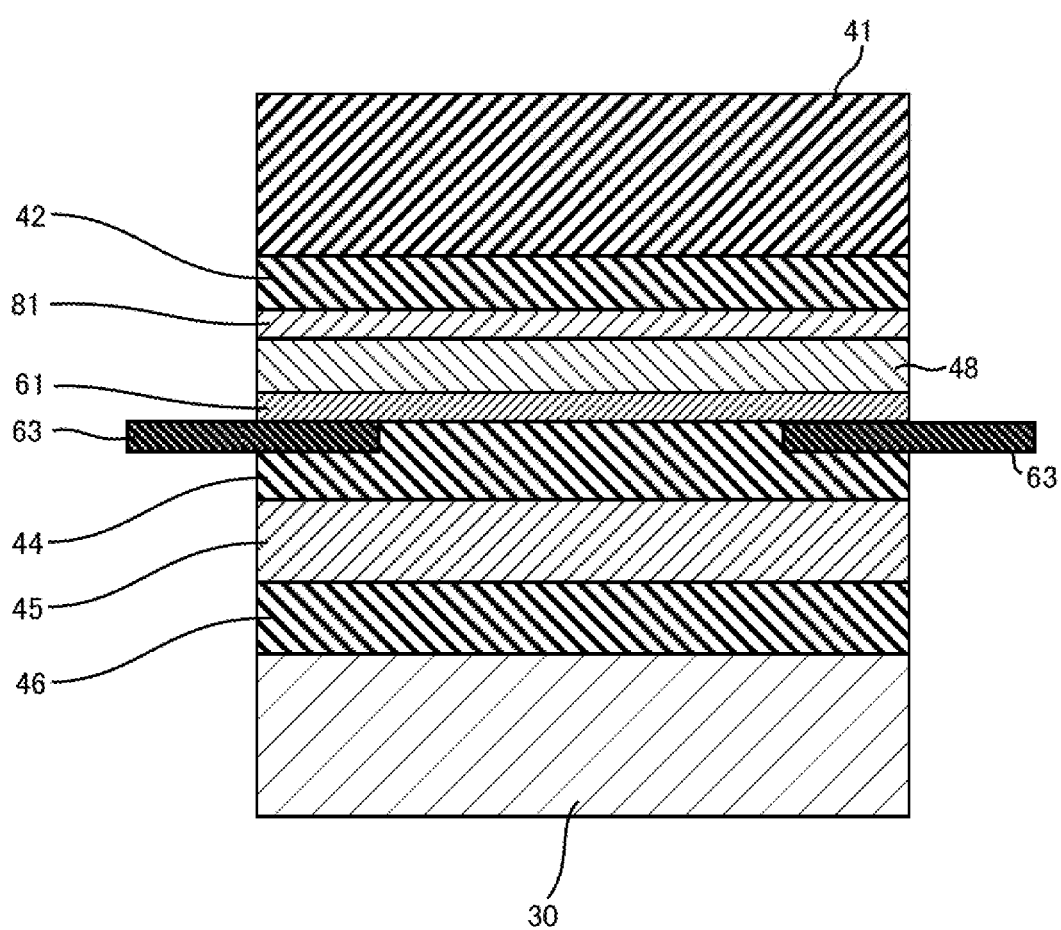

FIG. 23 is a cross-sectional view illustrating a state of the touch panel according to Embodiment 4, taken along a cross section parallel to the Y-Z plane.

Figure 24:
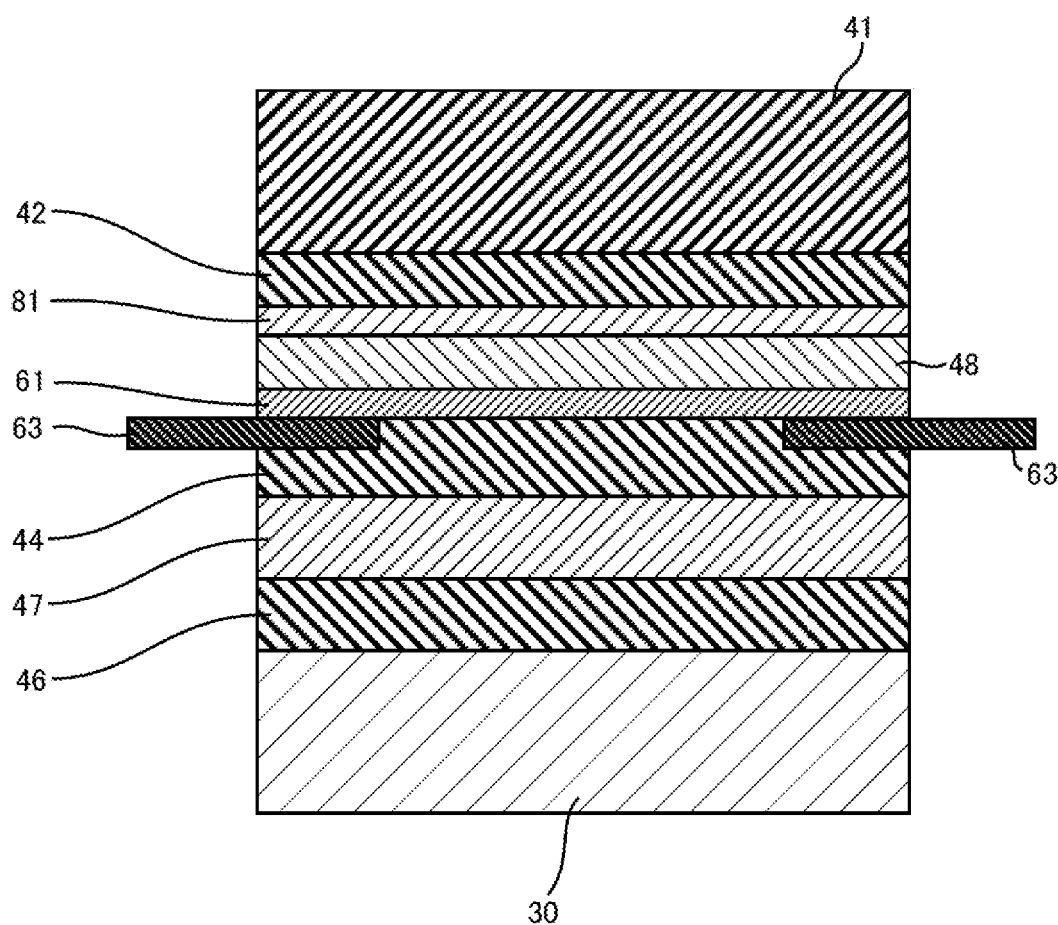

FIG. 24 is a cross-sectional view illustrating a state of a modification example of the touch panel according to Embodiment 4, taken along a cross section parallel to the Y-Z plane.

MODE FOR CARRYING OUT THE INVENTION

An antenna built-in touch panel according to an embodiment of the present invention includes: a touch panel; and an antenna that reads information via near field wireless communication, wherein the touch panel includes a first electrode layer and a second electrode layer, and the antenna is provided in at least one of the first electrode layer and the second electrode layer of the touch panel (the first configuration).

According to this configuration, the antenna is provided in at least one of the first electrode layer and the second electrode layer of the touch panel, which allows the device to have a smaller thickness, as compared with the configuration in which the antenna is provided in a layer different from the layer of the touch panel. Further, since the number of layers can be reduced, the device can be manufactured at a lower cost.

The first configuration is preferably further characterized in that the first electrode layer includes a plurality of electrodes arranged along a first direction; the second electrode layer includes a plurality of electrodes arranged along a second direction that intersects with the first direction; and the antenna includes, in at least one of the first electrode layer and the second electrode layer, a plurality of antenna lines that are arranged in the same layer as that of the electrodes so as to be parallel with the electrodes, in an area corresponding to a pixel region of the touch panel (the second configuration).

According to the second configuration, the antenna includes a plurality of antenna lines that are arranged in the same layer as that of the electrodes so as to be parallel with the electrodes, in an area corresponding to a pixel region of the touch panel. This allows the device to have a smaller thickness, as compared with the configuration in which the antenna is provided in a layer different from the layer of the touch panel. Further, since the number of layers can be reduced, the device can be manufactured at a lower cost.

The first configuration is preferably further characterized in that a line pattern including a switch is provided on at least one of the first electrode layer and a second electrode layer, the line pattern forming an electrode pattern of the touch panel when the switch is switched to a first state, and forming an antenna pattern when the switch is switched to a second state (the third configuration).

The third configuration includes a line pattern that functions as an antenna pattern or as a line pattern depending on the switching operation of the switch. This allows the device to have a smaller thickness, as compared with the configuration in which the antenna pattern and the electrode pattern of the touch panel are provided in different layers, respectively. Further, since the number of layers can be reduced, the device can be manufactured at a lower cost.

The third configuration is preferably further characterized in further including a control circuit that is connected to the line pattern, the control circuit supplying a signal for driving the electrodes of the touch panel when the switch is switched to the first state, and supplying a signal for driving the antenna pattern when the switch is switched to the second state (the fourth configuration).

With this configuration, it is possible to selectively cause the line pattern to function as the electrodes of the touch panel or the antenna, by time-divided driving.

Any one of the first to fourth configurations is preferably further characterized in that the antenna is a metal mesh (the fifth configuration).

The first configuration is preferably further characterized in that the antenna includes an antenna layer that includes a plurality of antenna patterns that are arrayed in parallel with one another, and at least a part of the antenna patterns are arranged so as to overlap when the antenna layer is viewed in a plan view (the sixth configuration).

According to this configuration, at least a part of the antenna patterns are arranged so as to overlap when the antenna layer is viewed in a plan view. Even if an object to be read is located at such a position that it cannot be read with one antenna pattern, this configuration increases the possibility that the IC card can be read with an antenna pattern that is adjacent to and overlaps with the foregoing antenna pattern. This makes it possible to provide an antenna built-in touch panel that has no insensitive area of the antenna on the touch surface.

The sixth configuration is preferably further characterized in that at least a part of the antenna patterns are arranged so as to be shifted by half pitch (the seventh configuration).

This configuration allows the antenna patterns to be arranged regularly and efficiently.

The sixth of seventh configuration is preferably further characterized in further including FPC substrates that are connected with the antenna patterns at both ends in a second direction that intersects with the first direction, wherein, in a portion where antenna lines of adjacent ones of the antenna patterns intersect with each other when viewed in a plan view, either one of the antenna lines is arranged through a contact hole formed in the FPC substrate (the eighth configuration).

This configuration makes it possible to cause the antenna lines of adjacent ones of the antenna patterns to intersect in the FPC substrate area without being in contact with each other.

Any one of the sixth to eighth configurations is preferably further characterized in that each of the antenna patterns is in a loop form or in a spiral form wound twice or more (the ninth configuration).

Any one of the sixth to ninth configurations is preferably further characterized in that two of the antenna layers are provided, and the two antenna layers are arranged in such a manner that a direction in which the antenna patterns included in one of the two antenna layers are arrayed, and a direction in which the antenna patterns included in the other antenna layer are arrayed, intersect at right angles (the tenth configuration).

With this configuration, the reading can be performed with the two antenna layers, in the two directions that intersect at right angles, respectively, whereby the x, y coordinates of the position of the object to be read can be detected.

Embodiment

The following description describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of a part of constituent members is omitted. Further, the dimension ratios of the constituent members illustrated in the drawings do not necessarily indicate the real dimension ratios.

Embodiment 1

Figure 1:
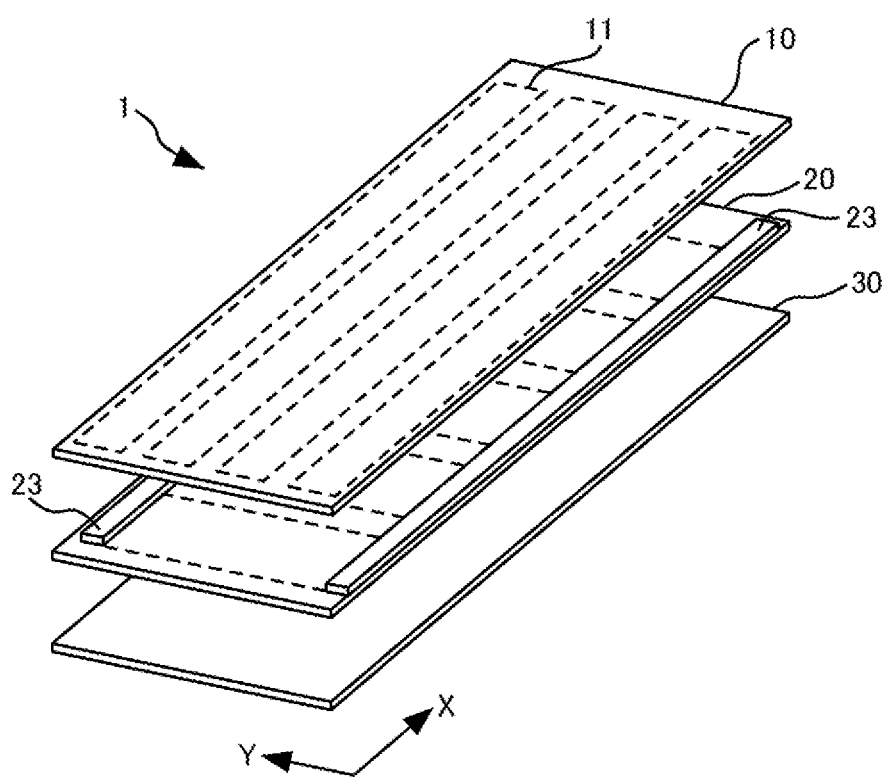
FIG. 1 is an exploded perspective view illustrating a schematic configuration of a touch panel in Embodiment 1.

FIG. 1 is an exploded perspective view illustrating a schematic configuration of an antenna built-in touch panel (hereinafter simply referred to as a "touch panel") 1 in Embodiment 1. As illustrated in FIG. 1, the touch panel 1 includes a sensing electrode layer 10, a drive electrode layer 20, and a display panel 30. In the drive electrode layer 20, antenna patterns are formed together with drive electrodes, as is described later.

When a user touches the screen with his/her finger, a pen, or the like, the touch panel 1 detects the touch position, and performs a processing operation corresponding to an object displayed at the touch position. When an IC card approaches the screen of the touch panel 1, antenna patterns formed in the drive electrode layer 20 read information of the IC card in a non-contact state, and performs a corresponding processing operation. In other words, the touch panel 1 according to the present embodiment can be subjected to both types of input operations, i.e., input by a touch operation with a finger, a pen, or the like, and input by reading of an IC card.

The display panel 30 is, for example, a liquid crystal panel. An embodiment in which the display panel 30 is a liquid crystal panel is described as the present embodiment, but the display panel 30 is not limited to a liquid crystal panel. An arbitrary display panel can be used as the display panel 30 as long as it is a panel that has a function of displaying an image, such as an organic electroluminescence (EL) panel. In FIG. 1, the illustration of known members of the display panel 30 such as a backlight is omitted, and detailed descriptions of the same are omitted hereinafter as well.

The drive electrode layer 20 includes a plurality of drive electrodes 25 (see FIG. 6) formed on a substrate made of an insulative material (for example, polyethylene terephthalate (PET)). The drive electrodes 25 are arrayed in the X direction. The number of the drive electrodes 25 is arbitrary. The drive electrodes 25 are, for example, transparent conductive patterns (transparent electrodes) formed with ITO or the like. Further, the drive electrodes 25 may be formed with predetermined patterns that are obtained by notching metal mesh made of thin metal wires (for example, copper). By forming the drive electrodes 25 in this way, it can be made sure to prevent the drive electrodes 25 from blocking light (to ensure a certain level of light permeability). In the driver electrode layer 20, antenna patterns 21 (see FIG. 5) are formed, together with the drive electrodes 25. The drive electrodes and the antenna patterns in the drive electrode layer 20 are described later in detail.

The sensing electrode layer 10 includes a plurality of sensing electrodes 11 that are arrayed in the Y direction, which intersects with the drive electrodes at right angles. The sensing electrodes 11 are made of a material identical to that of the drive electrodes 25. The number of the sensing electrodes 11 is also arbitrary.

Each drive electrode 25 has a shape elongated in the Y direction. Each sensing electrode 11 has a shape elongated in the X direction. Each of the drive electrodes 25 and the sensing electrodes 11 is connected to a touch panel controller (not illustrated) via a lead line. The touch panel controller outputs a gate driving signal for sequentially driving the drive electrodes 25, thereby driving the drive electrodes 25 sequentially. This causes electric fields to be generated between the drive electrodes 25 and the sensing electrodes 11. Then, the touch panel controller receives sense signals from the sensing electrodes 11, and checks the signal values of the sense signals, thereby detecting a touch point (a portion where the electric field has changed) on the touch panel surface.

Figure 2:
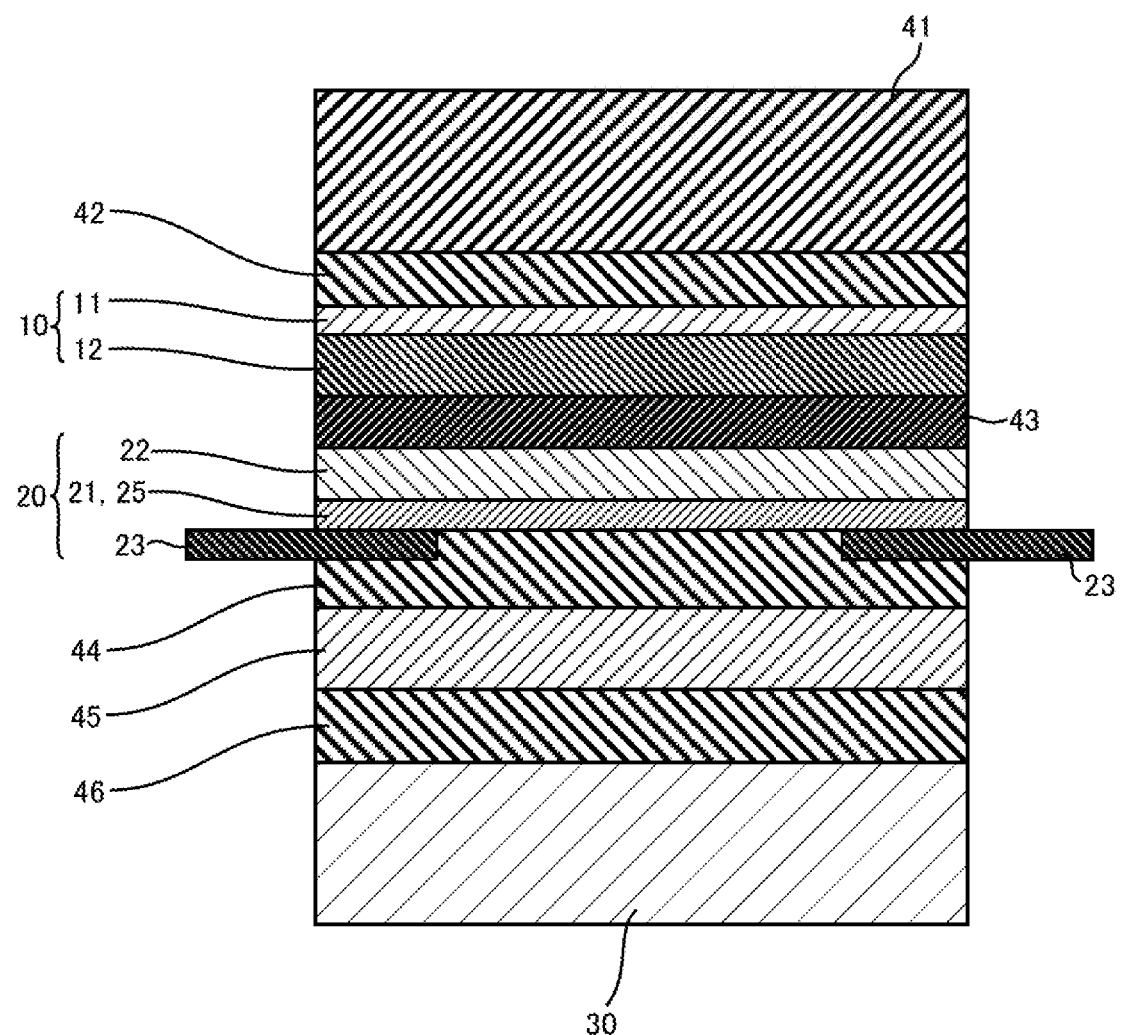
FIG. 2 is a cross-sectional view illustrating a state of the touch panel according to Embodiment 1, taken along a cross section parallel to the Y-Z plane.

FIG. 2 is a cross-sectional view illustrating the touch panel 1, taken along a cross section parallel to the Y-Z plane. As illustrated in FIG. 2, the sensing electrode layer 10 has the sensing electrodes 11 on one surface of a PET film 12. The drive electrode layer 20 includes the drive electrodes 25 and the antenna patterns 21 on one surface of a PET film 22. Between the sensing electrode layer 10 and the drive electrode layer 20, there is provided an optically clear adhesive (OCA) layer 43. Incidentally, though FIG. 2 illustrates an exemplary configuration in which the sensing electrode layer 10 and the drive electrode layer 20 are formed on different PET films, respectively, and the OCA layer 43 is provided therebetween, the configuration may be as follows instead: the sensing electrodes 11, and the drive electrodes 25 as well as the antenna patterns 21, are formed on surfaces of one PET film, respectively.

To both ends in the Y direction of the drive electrode layer 20, flexible printed circuit (FPC) substrates 23 are connected.

Between the display panel 30 and the drive electrode layer 20, there are provided an optically clear resin (OCR) layer 46, a protection PET film 45, and an optically clear adhesive (OCA) layer 44. The OCR layer 46 and the OCA layer 44 have a function of filling the clearances between the display panel 30, the protection PET film 45, and the drive electrode layer 20, and at the same time, a function of adjusting the refractive index, and the like.

Figure 3:
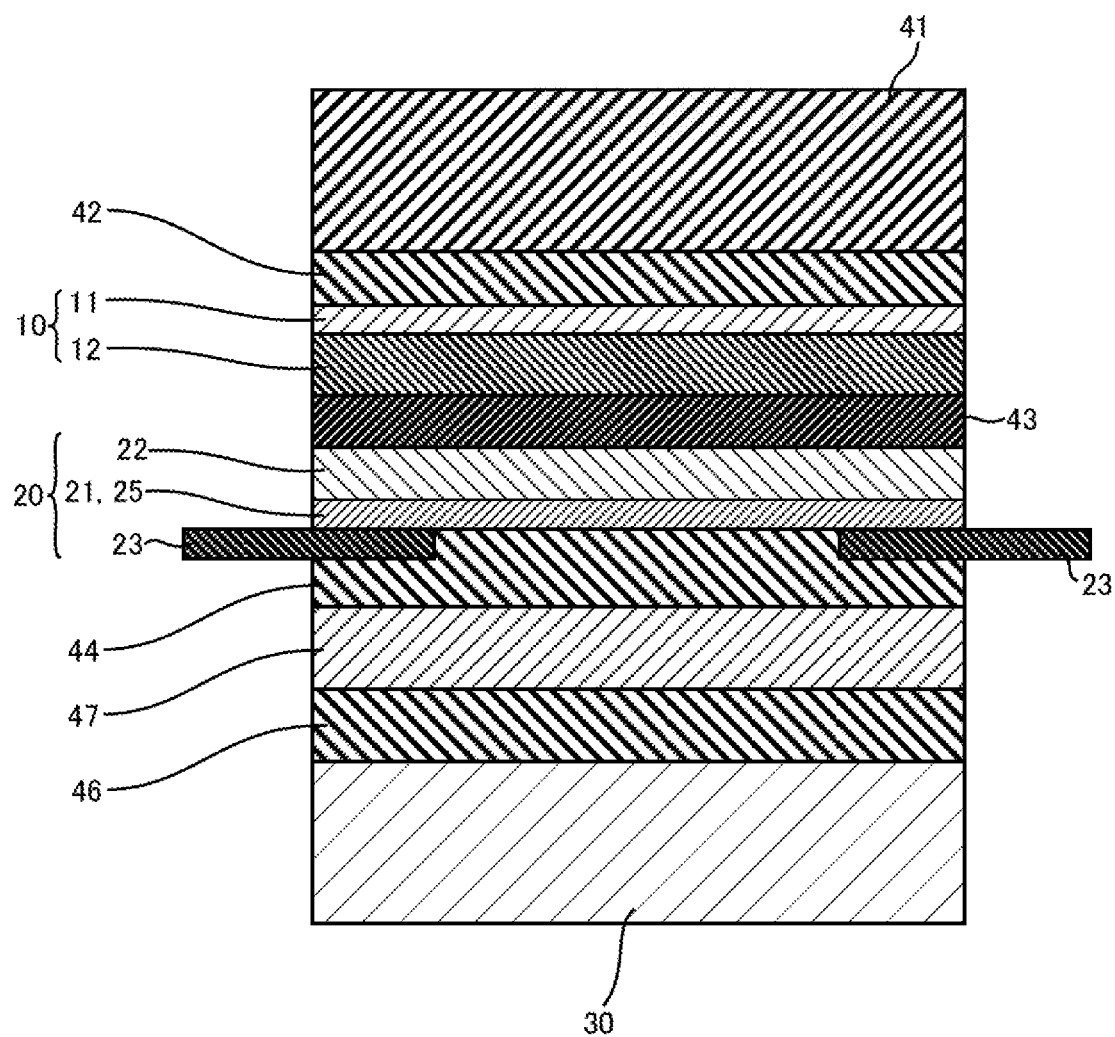
FIG. 3 is a cross-sectional view illustrating a state of a modification example of the touch panel according to Embodiment 1, taken along a cross section parallel to the Y-Z plane.

Alternatively, as illustrated in FIG. 3, the configuration may be such that a light diffusion film 47 is included in place of the protection PET film 45 illustrated in FIG. 2. By providing the light diffusion film 47 between the display panel 30 and the drive electrode layer 20, moire occurring due to the interference between the pixel patterns on the display panel 30 and the antenna patterns in the drive electrode layer 20, and the like, can be suppressed.

A lead line (not illustrated in FIG. 2) is drawn from an end in the X direction of the sensing electrode 11 of the sensing electrode layer 10, and is connected to the above-described touch panel controller (not illustrated). The electrode patterns 21 of the drive electrode layer 20 is connected to the touch panel controller via FPC substrates 23. In an upper layer of the sensing electrode layer 10, an OCA layer 42 and a cover glass 41 are laminated.

Figure 4:
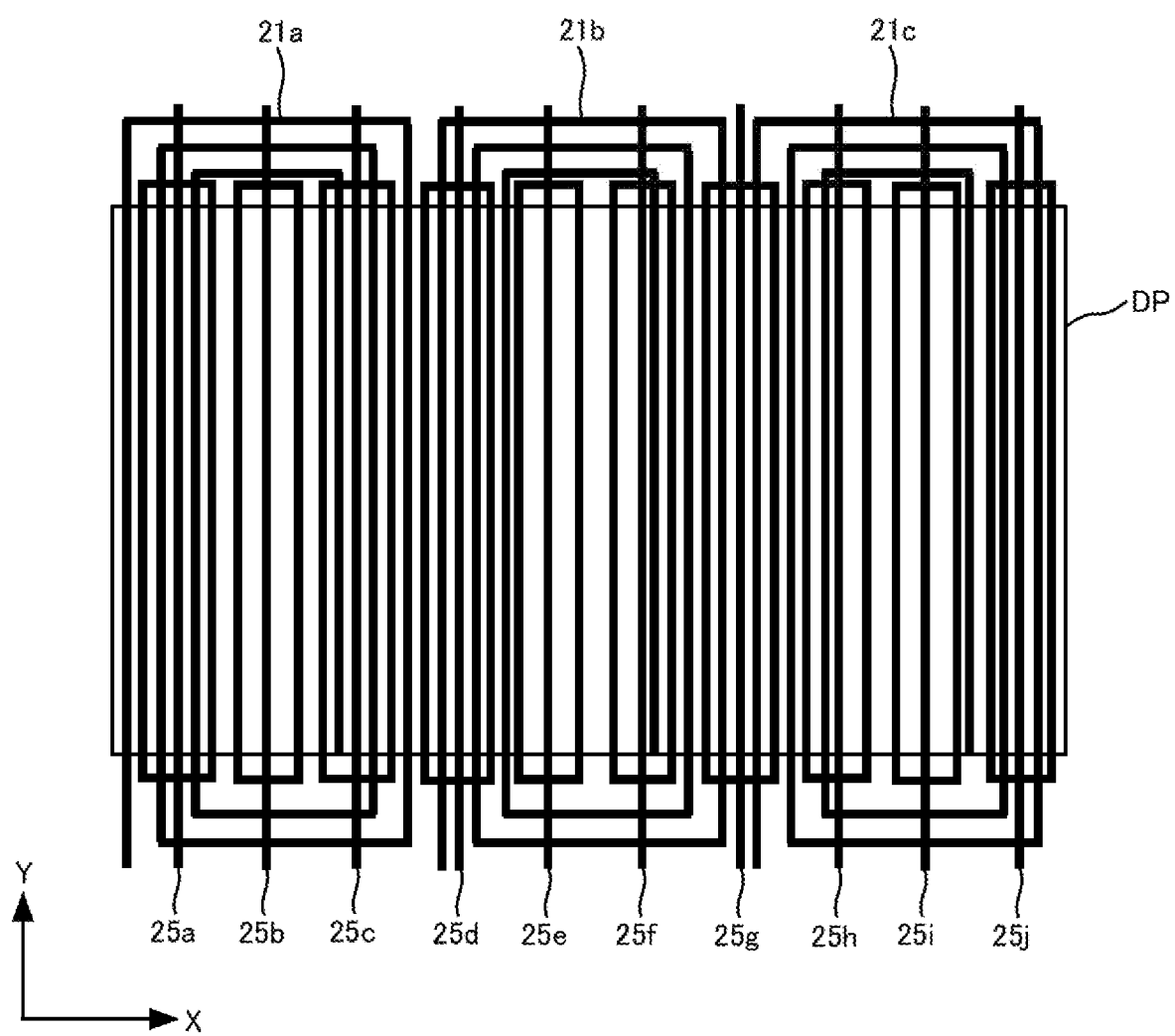
FIG. 4 is a schematic plan view schematically illustrating arrangement of drive electrodes and antenna patterns.
Figure 5:
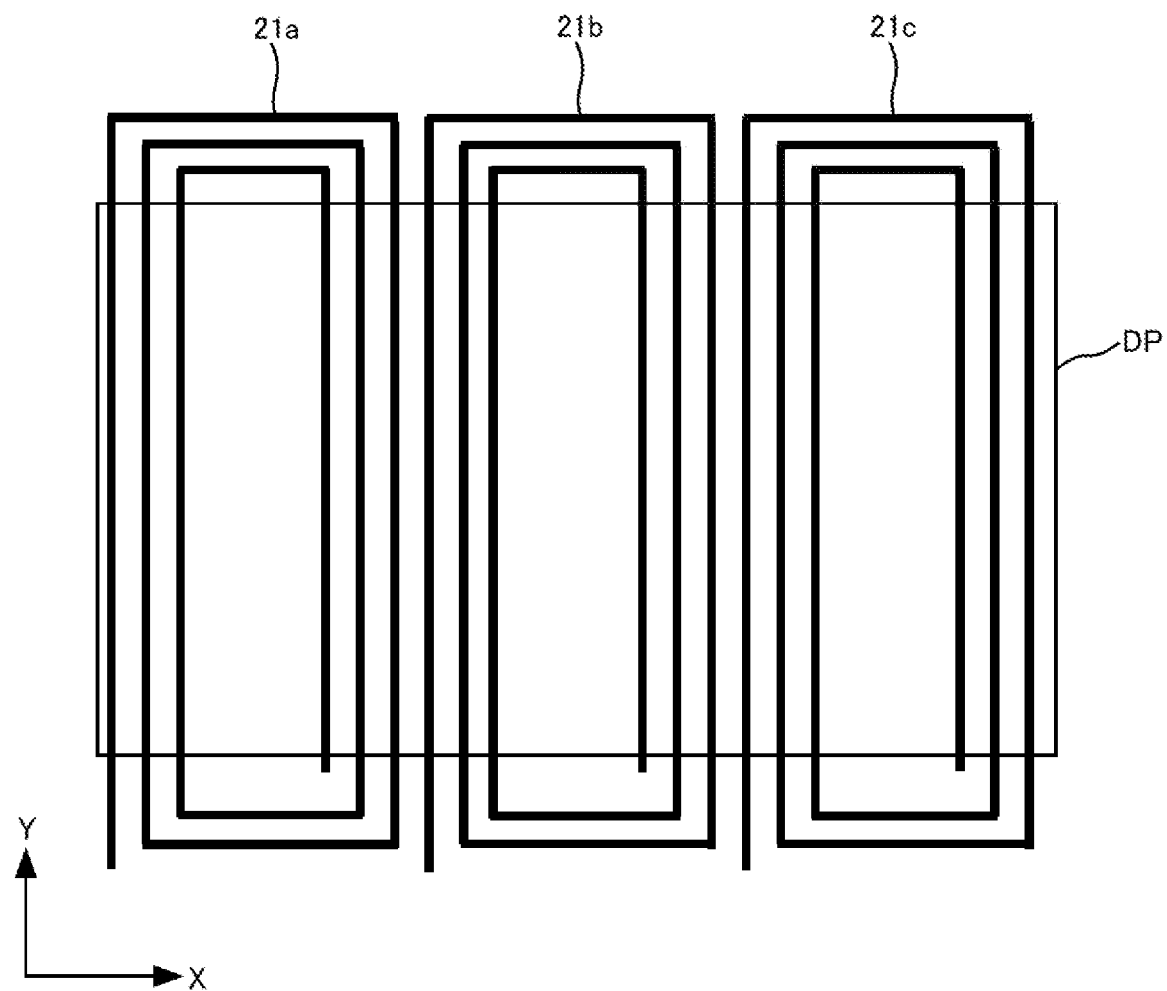
FIG. 5 is a schematic plan view illustrating antenna patterns extracted from FIG. 4.
Figure 6:
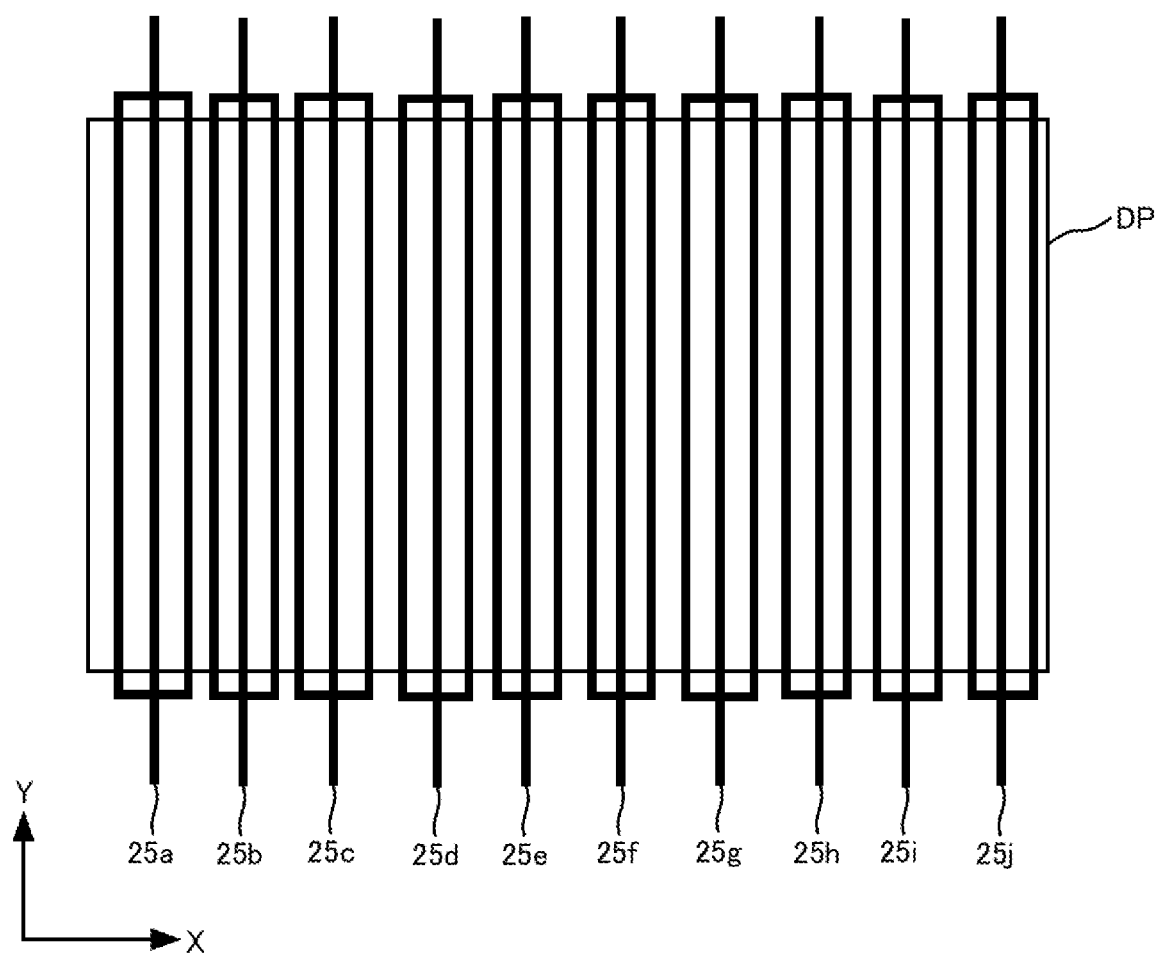
FIG. 6 is a schematic plan view illustrating drive electrodes extracted from FIG. 4.

The following description describes arrangement of the drive electrodes and the antenna patterns in the drive electrode layer 20, while referring to FIGS. 4 to 6. In the drive electrode layer 20, as illustrated in FIG. 4, the drive electrodes 25 and the antenna patterns 21 of the touch panel are formed. FIG. 5 illustrates some antenna patterns 21 extracted from FIG. 4. FIG. 6 illustrates some drive electrodes 25 extracted from FIG. 4.

As illustrated in FIG. 5, each of the antenna patterns 21a, 21b, 21c is formed as an antenna coil t in a spiral form wound three times in the present embodiment. The shape of the antenna pattern, however, is not limited to this, and it may be in a loop form or in a spiral form wound twice, or four or more time. Further, the number of the antenna patterns formed in the drive electrode layer 20 is arbitrary. In the description below, in a case where it is not necessary to distinguish individual antenna patterns among the antenna patterns 21, the antenna patterns are generally referred to as "antenna patterns 21".

The antenna pattern 21 extends in the Y direction in the pixel region DP, and extends in the X direction on the FPC substrates outside the pixel region DP (see FIG. 3).

As illustrated in FIG. 6, in the pixel region DP, each of the drive electrodes 25a, 25b, 24c, 25d, 25e, 25f, 25g, 25h, 25i, 25j includes three electrode portions that extend in the Y direction. In the following description, in a case where it is not necessary to distinguish individual ones of the drive electrodes 25, they are referred to generally as "drive electrodes 25". In the example illustrated in FIG. 6, the three electrode portions that each drive electrode 25 has are connected one terminal at each end in the Y direction, and are connected to the touch panel controller via the FPC substrates outside the pixel region DP (see FIG. 3). The configuration of the drive electrode 25 is not limited to this configuration. For example, the number of the electrode portions is not limited to three, but is arbitrary. Further, the drive electrode 25 may be connected to the touch panel controller, only at one end in the Y direction.

The drive electrodes 25 and the antenna patterns 21 are formed in the same layer, on the surface of a substrate (a PET substrate 22) of the drive electrode layer 20, so as not to overlap with each other when viewed in a plan view, as illustrated in FIG. 4. The drive electrodes 25 and the antenna patterns 21 may be formed with different materials, or alternatively, may be formed with the same material simultaneously. For example, a metal mesh is formed over an entirety of the PET substrate 22, and is notched into appropriately patterns, whereby the drive electrodes 25 and the antenna patterns 21 can be formed simultaneously. Further, by leaving the metal mesh also in areas where the drive electrodes 25 or the antenna patterns 21 are unnecessary in the pixel region DP (leaving the same in an electrically floating state), the drive electrodes 25 and the antenna patterns 21 can be made less visible. Alternatively, the drive electrodes 25 and the antenna patterns 21 may be formed with a transparent metal.

The respective widths of the antenna patterns 21 and the drive electrodes 25 may be arbitrarily set, under a condition that they do not overlap when viewed in a plan view.

The drive electrodes 25 and the antenna patterns 21 intersect when viewed in a plan view intersect outside the pixel region DP (on the FPC substrates 23) as illustrated in FIG. 4, but as either of these go through contact holes formed in the FPC substrates 23 so as to be arranged in another layer, whereby the drive electrodes 25 and the antenna patterns 21 are never electrically in contact with each other.

The drive electrodes 25 are connected with the touch panel controller as described above, and are driven in accordance with a driving signal from the touch panel controller. On the other hand, the antenna patterns 21 are connected with an antenna controller (not shown), and are driven in accordance with a driving signal from the antenna controller.

The antenna controller applies a driving signal to the antenna patterns 21a to 21c sequentially. For example, in a case where a near field communication (NFC) card is to be detected, the driving is performed with a sinusoidal wave of 13.56 megahertz. This causes one of the antenna patterns 21a to 21c to detect an IC card, whereby the touch position of the IC card can be detected in the X direction.

As is described above, in the case of the touch panel 1 according to the present embodiment, in which the antenna patterns 21 are formed in the same layer as that for the drive electrodes 25 in the drive electrode layer 20, the device has a smaller thickness, as compared with a case where the antenna layer is provided in a layer different from the touch panel layer. Further, since the number of layers can be reduced, the device can be manufactured at a lower cost.

Further, in the touch panel 1 according to the present embodiment, the antenna patterns 21 and the drive electrodes 25 are independently provided as lines, which provides an advantage that the driving of the antenna and the driving of the touch panel can be carried out in parallel simultaneously.

The configuration of the present embodiment described herein is merely an example, and other arbitrary constituents can be added as required. Further, in the configuration illustrated in FIGS. 1 to 3, the sensing electrode layer 10 is arranged on the front surface side for an operator, and the drive electrode layer 20 is arranged between the sensing electrode layer 10 and the display panel 30, but the order of lamination of the sensing electrode layer 10 and the drive electrode layer 20 may be reverse to this. Still further, the present embodiment is described with reference to an example in which the antenna patterns are provided in the drive electrode layer 20, but the configuration can be such that the antenna patterns are provided in not the drive electrode layer 20 but the sensing electrode layer 10.

Figure 7:
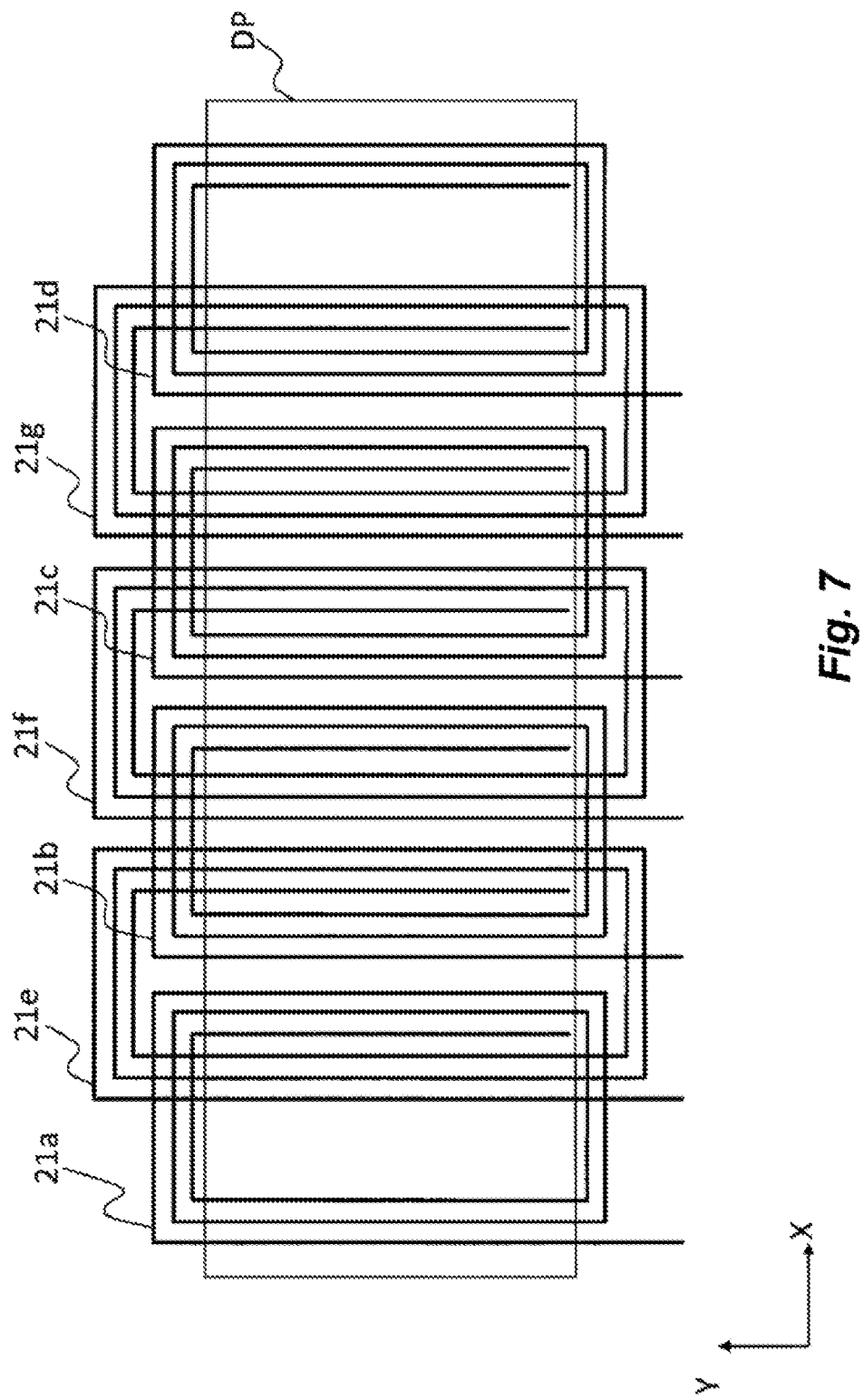
FIG. 7 is a schematic plan view schematically illustrating arrangement of antenna patterns in a modification example of Embodiment 1.

Still further, a modification example of Embodiment 1 in which the antenna patterns 21 in the drive electrode layer 20 have a configuration as illustrated in FIG. 7 is also preferable. In the example in FIG. 7, the antenna pattern 21 includes antenna patterns 21a to 21g each of which is formed in a spiral form wound three times. The antenna pattern 21, however, is not limited to the spiral form that is wound three times, and instead, it can be formed in an antenna coil in a loop form or in a spiral form wound twice or more times.

The antenna patterns 21a to 21g illustrated in FIG. 7 are formed so as to overlap while being successively shifted by half pitch. For example, the center line of the clearance between the antenna pattern 21a and the antenna pattern 21b falls on the center line of the antenna pattern 21e. Here, an exemplary configuration that includes seven antenna patterns is illustrated, but the configuration is not limited to this; the number of antenna patterns is arbitrary.

In the pixel region DP, each of the antenna lines of the antenna patterns 21 is formed in a linear form extending in the Y direction. More specifically, in the pixel region DP, the antenna line of any one of the antenna patterns 21 does not intersect with adjacent one of the antenna lines, but is arranged in parallel in the Y direction.

On the other hand, the antenna lines reaching the FPC substrates 23 at an end in the Y direction of the drive electrode layer 20 extend along the X direction. Then, in each portion on the FPC substrate 23 where antenna lines of adjacent ones of the antenna patterns intersect with each other when viewed in a plan view, the antenna line of either one of the antenna patterns goes through a contact hole formed in the FPC substrate 23 to be arranged in another layer of the FPC substrate 23. This makes it possible to cause antenna lines of adjacent ones of the antenna patterns to intersect with each other in the FPC substrate areas.

A portion extending in the X direction of the antenna pattern 21 is preferably arranged, not in the pixel region DP, but on the FPC substrate 23. With this configuration, all of the antenna lines are arranged in parallel in the Y direction in the pixel region DP, which makes the antenna lines less visible.

Though the illustration is omitted in FIG. 7, in the pixel region DP, the drive electrodes 25 are arranged so as to be parallel with the antenna lines of the antenna patterns 21a to 21g, and not to overlap with the antenna lines of the antenna patterns 21a to 21g when viewed in a plan view.

The antenna patterns 21 are connected with an antenna controller (not shown) via the FPC substrates 23. The antenna controller applies a driving signal to the antenna patterns 21a to 21g from an end in the X direction sequentially. For example, in a case where a near field communication (NFC) card is to be detected, the driving is performed with a sinusoidal wave of 13.56 megahertz. For example, in the case of the exemplary arrangement illustrated in FIG. 7, the antenna patterns 21 can be driven in the order of the antenna patterns 21a, 21e, 21b, 21f, 21c, 21g, 21d.

According to the modification example illustrated in FIG. 7, the adjacent ones of the antenna patterns overlap with each other. Even if, therefore, an IC card that is located at such a position that it cannot be detected with one antenna pattern, the IC card can be detected with an antenna pattern adjacent thereto. The principles of this are described herein.

(a) and (b) of FIG. 8 schematically illustrate states where an antenna cannot detect an IC card. As illustrated in (a) and (b) of FIG. 8, for example, when the middle point of the IC card 91 is positioned on an antenna line 92, signals of the IC card 91 are not read out in some cases. Since the magnetic field generated from the antenna line 92 is in a horizontally symmetric concentric circle form, in a case where the antenna line 92 passes through the midpoint of the IC card 92, magnetic fields generated on the left and right sides cancel each other, which causes no electromotive force to be generated on the IC card side, thereby causing the state to shift to an insensitive state. To make the explanation more understandable, (a) and (b) of FIG. 8 illustrate an exemplary case where one antenna line passes through the midpoint of the IC card, but in a case of a coil-form antenna, the identical phenomenon occurs when the midpoint of the IC card is positioned at the center of the bunch of a plurality of antenna lines that form the coil.

In contrast, with the modification example illustrated in FIG. 7, even if, an IC card touches in such a manner that the midpoint of the IC card is positioned on the antenna line of one antenna pattern of the antenna patterns 21a to 21g, the IC card can be detected by an antenna pattern adjacent thereto. For example, even if it is impossible to detect an IC card during the driving of the antenna pattern 21a as the antenna line of the antenna pattern 21a falls on the midpoint of the IC card, the adjacent antenna pattern, that is, the antenna pattern 21e, which is driven next, can detect the IC card.

The method for driving the antenna patterns 21, however, may be, not the above-described method of driving all of the antenna patterns sequentially from an end in the X direction, but a method of simultaneously driving two of the antenna patterns that are located at distanced positions in the X direction. For example, the method is such that the antenna patterns 21a and 21c are simultaneously driven, and subsequently, the antenna patterns 21e and 21g, the antenna patterns 21b and 21d, the antenna patterns 21d and 21g, . . . , are sequentially driven at a given cycle. Adjacent ones of the antenna patterns are sequentially driven by such a driving method as well, which allows an IC card that cannot be detected by one antenna pattern to be detected by another adjacent thereto.

As is described above, in the antenna device 1 according to the modification example illustrated in FIG. 7, the antenna patterns 21 are arranged so as to overlap when the drive electrode layer 20 is viewed in a plan view, whereby an IC card located at such a position that it cannot be detected by one antenna pattern can be detected by another antenna pattern adjacent thereto. This makes it possible to realize a device in which there is no insensitive area throughout the entire display area, thereby to improve the usability. Further, since the antenna patterns and the drive electrodes are formed in one line layer (the drive electrode layer 20) is a line layer composed of a single layer, it can be manufactured at a lower cost.

Though an exemplary configuration in which all of the antenna patterns 21 are arranged so as to overlap while being shifted by half pitch is described as the present embodiment, the arrangement of the antenna patterns 21 is not limited to this arrangement. Any configuration is acceptable as long as, among a plurality of antenna patterns, at least a part of the antenna patterns are arranged so that each overlaps with an adjacent one, and the interval is not limited to half pitch.

Embodiment 2

FIG. 9 is an exploded perspective view illustrating a schematic configuration of an antenna built-in touch panel (hereinafter simply referred to as a "touch panel") 2 in Embodiment 2. As illustrated in FIG. 9, the touch panel 2 includes a sensing electrode layer 10, a drive electrode layer 60, and a display panel 30. In the drive electrode layer 60, electrode patterns 61 that double as drive electrodes and an antenna are formed. The electrode pattern 61 is subjected to time-divided driving by switching operations of switches, which is described later. More specifically, the electrode patterns 61 are connected to the touch panel controller during a period while the electrode patterns 61 operate as the drive electrodes of the touch panel, and are connected to the antenna controller during a period while the electrode patterns 61 operate as the antenna. The electrode patterns in the drive electrode layer 60 are described in detail later.

FIG. 10 is a cross-sectional view illustrating a state of the touch panel 2, taken along a cross section parallel to the Y-Z plane. As illustrated in FIG. 10, the drive electrode layer 60 includes electrode patterns 61 that double as the drive electrodes and the antenna, on one surface of a PET film 62. Incidentally, FIG. 10 illustrates an exemplary configuration that includes the sensing electrode layer 10 and the drive electrode layer 60, which are formed on different PET films, respectively, and further includes an OCA layer 43 interposed therebetween, but the configuration may be such that the sensing electrodes 11 and the electrode patterns 61 are formed on both surfaces of one PET film, respectively.

To both ends in the Y direction of the drive electrode layer 60, flexible printed circuit (FPC) substrates 63 are connected.

Between the display panel 30 and the drive electrode layer 60, there are provided an optically clear resin (OCR) layer 46, a protection PET film 45, and an optically clear adhesive (OCA) layer 44. The OCR layer 46 and the OCA layer 44 have a function of filling the clearances between the display panel 30, the protection PET film 45, and the drive electrode layer 60, and at the same time, a function of adjusting the refractive index, and the like.

Alternatively, as illustrated in FIG. 11, the configuration may be such that a light diffusion film 47 is included in place of the protection PET film 45 illustrated in FIG. 10. By providing the light diffusion film 47 between the display panel 30 and the drive electrode layer 60, moire occurring due to the interference between the pixel patterns on the display panel 30 and the electrode patterns 61 in the drive electrode layer 60, and the like, can be suppressed.

The following description describes the configuration and actions of the electrode patterns 61 of the drive electrode layer 60, while referring to FIGS. 12 to 14.

As illustrated in FIGS. 12 and 13, the electrode patterns 61 of the drive electrode layer 60 include electrode patterns 61a to 61c. The number of the electrode patterns, however, is not limited to three, but is arbitrary. The following description describes a detailed configuration, taking the electrode pattern 61a as an example. The electrode pattern 61a includes electrode lines L1a, L2a, L3a, L4a, L5a, L6a, L7a, and L8a. A switch sw1a is provided between the electrode lines L1a and L4a. A switch sw2a is provided between the electrode lines L2a and L5a. A switch sw3a is provided between the electrode lines L3a and L6a. Incidentally, the switches sw1a to sw3a, and the switches sw4a to sw9a described below, can be formed with thin film transistors or the like.

On the FPC substrates 63 outside the pixel region DP, antenna terminals TA1a and TA2a, and drive electrode terminals TE and TE2a are provided, as terminals that are connected to the electrode pattern 61a via switches. The antenna terminals TA1a and TA2a are connected to the above-described antenna controller. The drive electrode terminals TE1a and TE2a are connected to the above-described touch panel controller, and feeds a driving signal from the touch panel controller to the electrode pattern 61a.

The switch sw4a is connected to the electrode line L3a, and is connected to either the electrode line L7a or the drive electrode terminal TE1a depending on the switch operation. The switch sw5a is connected to the electrode line L2a, and is connected to either the electrode line L6a or the drive electrode terminal TE1a depending on the switch operation. The switch sw6a is connected to the electrode line L1a, and is connected to either the antenna terminal TA1a or the drive electrode terminal TE1a depending on the switch operation. The switch sw7a is connected to the electrode line L6a, and is connected to either the antenna terminal TA2a or the drive electrode terminal TE2a depending on the switch operation. The switch sw8a is connected to the electrode line L5a, and is connected to either the electrode line L7a or the drive electrode terminal TE2a depending on the switch operation. The switch sw9a is connected to the electrode line L4a, and is connected to either the electrode line L8a or the drive electrode terminal TE2a depending on the switch operation.

FIG. 12 is a circuit diagram illustrating states of the switches during a period while the electrode pattern 61 operates as an antenna. As illustrated in FIG. 12, during a period while the electrode pattern 61 operates as an antenna, the switches sw1a, sw2a, and sw3a are closed. Further, the switch sw4a is connected to the electrode line L7a. The switch sw5a is connected to the electrode line L8a. The switch sw6a is connected to the antenna terminal TA1a. The switch sw7a is connected to the antenna terminal TA2a. The switch sw8a is connected to the electrode line L7a. The switch sw9a is connected to the electrode line L8a. The switches sw1a to sw9a operate in this way, thereby causing the electrode pattern 61 to function as an antenna coil in a spiral form that is wound three times. For example, the antenna terminal TA1a works as a terminal for input to the antenna, and the antenna terminal TA2a works as a terminal for output from the antenna. The input/output relationship, however, may be opposite to this.

On the other hand, FIG. 13 is a circuit diagram illustrating states of the switches during a period while the electrode pattern 61 functions as a drive electrode. As illustrated in FIG. 13, during a period while the electrode pattern 61 operates as an antenna, the switches sw1a, sw2a, and sw3a are in an open state. The switch sw4a is connected to the drive electrode terminal TE1a. The switch sw5a is connected to the drive electrode terminal TE1a. The switch sw6a is connected to the drive electrode terminal TE1a. The switch sw7a is connected to the drive electrode terminal TE2a. The switch sw8a is connected to the drive electrode terminal TE2a. The switch sw9a is connected to the drive electrode terminal TE2a. The switches sw1a to sw9a operate in this way, thereby causing the electrode pattern 61 to function as a drive electrode having three parts extending from each of the drive electrode terminals TE1a and TE2a. From each of the drive electrode terminals TE1a and TE2a, the driving signal is input.

FIG. 14 illustrates an exemplary diving signal for the electrode pattern 61. As illustrated in FIG. 14, the driving with respect to the electrode pattern 61 is repeated cyclically using the trigger pulse TP as a starting point. The trigger pulse TP is, for example, given from the timing controller to the touch panel controller and the antenna controller. The point of time at which the trigger pulse is input is assumed to be t0. At the point of time t0, the switches of the electrode pattern 61 are switched to the states illustrated in FIG. 13. During the period from the point of time t0 to the point of time t1, a driving signal for driving the drive electrode is applied to the electrode pattern 61. This driving signal is, for example, a burst rectangular wave of about 8 KHz. In FIG. 14, the period while the driving signal for driving the drive electrode is applied is denoted by "$T_D$".

Next, when the point of time t1 arrives, the switches of the electrode pattern 61 are switched to the states illustrated in FIG. 12. During the period from the point of time t1 to the point of time t2, a driving signal for driving the antenna is applied to the electrode pattern 61. This driving signal is, for example, a sinusoidal wave of about 13.56 MHz. In FIG. 14, the period while the driving signal for driving the antenna electrode is applied is denoted by "$T_A$".

Then, when the point of time t2 arrives, the switches of the electrode pattern 61 are switched again to the states illustrated in FIG. 13, and the driving signal for driving the drive electrode is applied. Such a driving operation is repeatedly performed. In a case where the touch panel 2 is driven at 120 Hz, the switching cycle for the switches (time interval from t0 to t1) is about 8.3 millisecond.

As described above, the touch panel 2 according to the present embodiment, in which the electrode patterns 61 that double as the antenna and the drive electrodes are provided in the drive electrode layer 60, allows the device to have a smaller thickness, as compared with a case where an antenna layer is provided in a layer different from the electrode layer of the touch panel. Further, the number of layers can be decreased, which enables the manufacture at a lower cost. Still further, the electrode pattern 61 doubles as an antenna and a drive electrode, whereby only a smaller number of lines are needed. This allows the lines to be formed with a greater width, thereby allowing the lines to have reduced resistances. Still further, since the electrode pattern 61 has both of the functions as an antenna and a drive electrode, there is an advantage that costs for mounting can be reduced.

Further, as a modification example of Embodiment 2, it is also preferable that the electrode patterns 61 in the drive electrode layer 60 are arranged so that adjacent ones of the electrode patterns overlap with each other, as is the case with the antenna patterns 21 in FIG. 7, which are described as the modification example of Embodiment 1.

Embodiment 3

FIG. 15 is an exploded perspective view illustrating a schematic configuration of an antenna built-in touch panel (hereinafter simply referred to as a "touch panel") 3 according to Embodiment 3. As illustrated in FIG. 15, the touch panel 3 includes a sensing electrode layer 70, a drive electrode layer 20, and a display panel 30. In the sensing electrode layer 70, antenna patterns are formed together with sensing electrodes.

The sensing electrode layer 70 includes sensing electrodes 75a to 75j, and antenna patterns 71a to 71c, as illustrated in FIG. 18. The sensing electrodes 75 and the antenna patterns 71 are formed in the same layer, on a surface of a substrate (a PET substrate 72) of the sensing electrode layer 70, so as not to overlap when viewed in a plan view.

The materials and configurations of the sensing electrodes 75 and the antenna patterns 71 are identical to those of the drive electrodes 25 and the antenna patterns 21 of the drive electrode layer 20, and detailed descriptions of the same are omitted.

Incidentally, the sensing electrodes 75 and the antenna patterns 71 in the sensing electrode layer 70, as well as the drive electrodes 25 and the antenna patterns 21 in the drive electrode layer 20 may be formed on different PET films, respectively. Or alternatively, the former and the latter may be formed on both surfaces of one PET film, respectively.

FIG. 16 is a cross-sectional view illustrating an example in which, in the touch panel 3, as mentioned above, the sensing electrodes 75 and the antenna patterns 71 of the sensing electrode layer 70, as well as the drive electrodes 25 and the antenna patterns 21 of the drive electrode layer 20, are formed on both surfaces of one PET film 48, respectively. Further, as illustrated in FIG. 17, the configuration may be such that a light diffusion film 47 is included in place of protection PET film 45 illustrated in FIG. 16.

The present embodiment is described with reference to an exemplary configuration in which the sensing electrode layer 70 is arranged on the front surface side, and the drive electrode layer 20 is arrange between the sensing electrode layer 70 and the display panel 30, but the positions of the sensing electrode layer 70 and the drive electrode layer 20 may be reversed.

In a case where the antenna pattern 21 and the antenna pattern 71 are driven in the touch panel 3, an action of sequentially driving the antenna patterns 21, subsequently driving the antenna patterns 71 sequentially, and going back to the driving of the antenna patterns 21, may be repeated. For example, the antenna patterns are driven in the order of the antenna patterns 21a, 21b, 21c, the antenna patterns 71a, 71b, 71c, the antenna patterns 21a, 21b, 21c, the antenna patterns 71a, 71b, 71c, . . . .

Alternatively, different antenna controllers for driving the antenna patterns 21 and the antenna patterns 71, respectively, may be provided so as to independently drive the antenna patterns 21 and the antenna patterns 71, respectively. In this case, it is possible to drive the antenna patterns 21 and the antenna patterns 71 simultaneously.

By repeating the driving of the antenna patterns 21 and the antenna patterns 71 in this way, the position in the X direction (X coordinate) of an IC card can be detected with the antenna patterns 21, and the position in the Y direction (Y coordinate) of the IC card can be detected with the antenna patterns 71.

As is described above, in the case of the touch panel 3 according to the present embodiment, in which the antenna patterns 71 are formed in the same layer as that for the sensing electrodes 75 in the sensing electrode layer 70, the device has a smaller thickness, as compared with a case where the antenna layer is provided in a layer different from the touch panel layer. Further, since the number of layers can be reduced, the device can be manufactured at a lower cost.

Further, in the touch panel 3 according to the present embodiment, the antenna patterns 21 and the drive electrodes 25, as well as the antenna patterns 71 and the sensing electrodes 71, are independently provided as lines, which provides an advantage that the driving of the antenna and the driving of the touch panel can be carried out in parallel simultaneously.

Still further, a modification example of Embodiment 3 in which the antenna patterns 71 in the sensing electrode layer 70 have a configuration as illustrated in FIG. 19 is also preferable. In the example in FIG. 19, the antenna pattern 71 includes antenna patterns 71a to 71e each of which is formed in a spiral form wound three times. The antenna pattern 71, however, is not limited to the spiral form that is wound three times, and instead, it can be formed in an antenna coil in a loop form or in a spiral form wound twice or more times.

The antenna patterns 71a to 21e illustrated in FIG. 19 are formed so as to overlap in the Y direction while being successively shifted by half pitch. For example, the center line of the clearance between the antenna pattern 71a and the antenna pattern 71b falls on the center line of the antenna pattern 71d. Here, an exemplary configuration that includes five antenna patterns is illustrated, but the configuration is not limited to this; the number of antenna patterns is arbitrary.

In the pixel region DP, each antenna line of the antenna patterns 71 are formed in a linear form extending in the X direction. More specifically, in the pixel region DP, each antenna line of the antenna patterns 71 does not intersect with any adjacent one of the antenna lines, but is arranged in parallel in the X direction.

On the other hand, the antenna lines reaching the surfaces of the FPC substrates 73, located at ends in the X direction of the sensing electrode layer 70, extend along the Y direction. Then, in each portion on the FPC substrate 73 where antenna lines of adjacent ones of the antenna patterns intersect with each other when viewed in a plan view, the antenna line of either one of the antenna patterns goes through a contact hole formed in the FPC substrate 73 to be arranged in another layer of the FPC substrate 73. This makes it possible to cause antenna lines of adjacent ones of the antenna patterns to intersect with each other in the FPC substrate areas.

A portion extending in the Y direction of the antenna pattern 71 is preferably arranged, not in the pixel region DP, but on the FPC substrate 73. With this configuration, all of the antenna lines are arranged in parallel in the X direction in the pixel region DP, which makes the antenna lines less visible.

Though the illustration is omitted in FIG. 19, in the pixel region DP, the drive electrodes 75 are arranged so as to be parallel with the antenna lines of the antenna patterns 71a to 71e, and not to overlap with the antenna lines of the antenna patterns 71a to 71e when viewed in a plan view.

The antenna patterns 71 are connected with an antenna controller (not shown) via the FPC substrates 73. The antenna controller applies a driving signal to the antenna patterns 71a to 21e from an end in the Y direction sequentially. For example, in a case where a near field communication (NFC) card is to be detected, the driving is performed with a sinusoidal wave of 13.56 megahertz. For example, in the exemplary arrangement illustrated in FIG. 19, the antenna patterns 71 can be driven in the order of the antenna patterns 71a, 71d, 71b, 71e, 71c.

According to the modification example illustrated in FIG. 19, the adjacent ones of the antenna patterns overlap with each other. An IC card located at such a position that it cannot be detected with one antenna pattern, therefore, can be detected with an antenna pattern adjacent thereto.

The method for driving the antenna patterns 71, however, may be, not the above-described method of driving all of the antenna patterns sequentially from an end in the Y direction, but a method of simultaneously driving two of the antenna patterns that are located at distanced positions in the Y direction.

As is described above, in the antenna device 3 according to the modification example illustrated in FIG. 19, the antenna patterns 71 are arranged so as to overlap when the sensing electrode layer 70 is viewed in a plan view, whereby an IC card located at such a position that it cannot be detected with one antenna pattern can be detected with another antenna pattern adjacent thereto. This makes it possible to realize a device in which there is no insensitive area throughout the entire display area, thereby to improve the usability. Further, since the antenna patterns and the drive electrodes are formed as a single line layer (the sensing electrode layer 70), it can be manufactured at a lower cost.

Though an exemplary configuration in which all of the antenna patterns 71 are arranged so as to overlap while being shifted by half pitch is described as the present embodiment, the arrangement of the antenna patterns 71 is not limited to this arrangement. Any configuration is acceptable as long as, among a plurality of antenna patterns, at least a part of the antenna patterns are arranged so that each overlaps with an adjacent one, and the interval is not limited to half pitch.

Embodiment 4

FIG. 20 is an exploded perspective view illustrating a schematic configuration of an antenna built-in touch panel (hereinafter simply referred to as a "touch panel) 4 in Embodiment 4. As illustrated in FIG. 20, the touch panel 4 includes a sensing electrode layer 80, a drive electrode layer 60, and a display panel 30. In the sensing electrode layer 80, electrode patterns that double as the sensing electrodes and the antenna are formed.

The configuration and actions of the sensing electrode layer 80 are identical to the configuration and actions of the drive electrode layer 60 of Embodiment 2 described above, and detailed descriptions of the same are omitted. It should be noted that, whereas a plurality of electrode patterns 61 are provided in the drive electrode layer 60 so as to be arrayed along the X direction, a plurality of electrode patterns 81 are provided in the sensing electrode layer 80 so as to be arrayed along the Y direction as illustrated in FIGS. 21 and 22.

In the sensing electrode layer 80 as well, the electrode patterns 81 are subjected to time-divided driving, by switching operations of switches, to control the states of the electrode pattern 81 between the state of functioning as antenna (FIG. 21) and the state of functioning as sensing electrodes of the touch panel (FIG. 22). It is necessary to synchronize with driving signals of the drive electrode layer 60 and sensing electrode layer 80, so as to cause the sensing electrode layer 80 to function as sensing electrodes while the drive electrode layer 60 is functioning as drive electrodes of the touch panel.

Regarding the patterns for driving the drive electrode layer 60 and the sensing electrode layer 80, a variety of methods can be considered. More specifically, driving signals as illustrated in FIG. 14 are applied to the drive electrode layer 60 and the sensing electrode layer 80, respectively, and the trigger pulses TP for the drive electrode layer 60 and the sensing electrode layer 80 may be synchronized with each other, or may not be synchronized with each other. Further, the antenna patterns in the drive electrode layer 60 and the antenna patterns in the sensing electrode layer 80 may be driven simultaneously, or alternatively, during one period $T_A$, only either the antenna patterns in the drive electrode layer 60 or the antenna patterns in the sensing electrode layer 80 may be driven.

The electrode patterns 81 in the sensing electrode layer 80 and the electrode patterns 61 in the drive electrode layer 60 may be formed on different PET films, respectively, or alternatively, on both surfaces of one PET film, respectively.

FIG. 23 is a cross-sectional view illustrating an example in which, in the touch panel 4, as described above, the electrode patterns 81 in the sensing electrode layer 80 and the electrode patterns 61 in the drive electrode layer 60 are formed on both surfaces of one PET film 48, respectively. Alternatively, as illustrated in FIG. 24, the configuration includes a light diffusion film 47, in place of the protection PET film 45 illustrated in FIG. 23.

The present embodiment is described with reference to an example in which the sensing electrode layer 80 is arranged on the front surface side and the drive electrode layer 60 is arranged between the sensing electrode layer 80 and the display panel 30, but the positions of the sensing electrode layer 80 and the drive electrode layer 60 may be reversed.

As described above, the touch panel 4 according to the present embodiment, in which the electrode patterns 81 that double as the antenna and the sensing electrodes are provided in the sensing electrode layer 80 as well, allows the device to have a smaller thickness, as compared with a case where an antenna layer is provided in a layer different from the electrode layer of the touch panel. Further, the number of layers can be decreased, which enables the manufacture at a lower cost. Still further, since the electrode pattern 81 doubles as an antenna and a sensing electrode, only a smaller number of lines are needed. This allows the lines to be formed with a greater width, thereby allowing the lines to have reduced resistances. Still further, since the electrode pattern 81 has both of the functions as an antenna and a sensing electrode, there is an advantage that costs for mounting can be reduced.

Further, as a modification example of Embodiment 4, it is also preferable that the electrode patterns 81 in the sensing electrode layer 80 are arranged so that adjacent ones of the electrode patterns overlap with each other, as is the case with the antenna patterns 71 in FIG. 19, which are described as the modification example of Embodiment 3.

The above-described embodiment are merely examples for implementing the present invention. The present invention, therefore, is not limited to the above-described embodiment, and the above-described embodiment can be appropriately varied and implemented without departing from the spirit and scope of the invention.

For example, though an IC card and an NFC card are mentioned in the foregoing description as examples of objects from which information is to be read out via near field wireless communication, an object to be read is not limited to a card, and a variety of types can be adopted.

DESCRIPTION OF REFERENCE NUMERALS 1 to 4: touch panel
10: sensing electrode layer
20: drive electrode layer
21: antenna pattern
25: drive electrode
30: display panel
60: drive electrode layer
61: electrode pattern
70: sensing electrode layer
71: antenna pattern
80: sensing electrode layer
81: electrode pattern

The invention claimed is:

1. An antenna built-in touch panel comprising:
a touch panel;
an antenna that reads information via near field wireless communication; and
FPC substrates that are connected with the antenna patterns at both ends,
wherein the touch panel includes a first electrode layer and a second electrode layer,
the antenna is provided in at least one of the first electrode layer and the second electrode layer of the touch panel,
the antenna includes an antenna layer that includes a plurality of antenna patterns that are arrayed in parallel with one another,
at least a part of the antenna patterns are arranged so as to overlap each other when the antenna layer is viewed in a plan view, and
in a portion where antenna lines of adjacent ones of the antenna patterns intersect with each other when viewed in a plan view, either one of the antenna lines is arranged through a contact hole formed in the FPC substrate.

2. The antenna built-in touch panel according to claim 1, at least a part of the antenna patterns is arranged so as to be shifted by half pitch, the half pitch being half a length of each of the antenna patterns in a direction in which the antenna patterns are arrayed.

3. The antenna built-in touch panel according to claim 1, wherein each of the antenna patterns is in a loop form or in a spiral form wound twice or more.

4. The antenna built-in touch panel according to claim 1, wherein two of the antenna layers are provided, and
the two antenna layers are arranged in such a manner that a direction in which the antenna patterns included in one of the two antenna layers are arrayed, and a direction in which the antenna patterns included in the other antenna layer are arrayed, intersect at right angles.

5. The antenna built-in touch panel according to claim 1, wherein:
common lines and a switch are provided on at least one of the first electrode layer and the second electrode layer, an entire portion of the common lines and the switch forming an electrode pattern of the touch panel when the switch is switched to ON, and the entire portion of the common lines forming an antenna pattern when the switch is switched to OFF.

6. The antenna built-in touch panel according to claim 1, wherein the first electrode layer includes a plurality of electrodes arranged along a first direction;
the second electrode layer includes a plurality of electrodes arranged along a second direction that intersects with the first direction; and
the antenna includes, in at least one of the first electrode layer and the second electrode layer, a plurality of antenna lines that is arranged in the same layer as that of the electrodes so as to be parallel with the electrodes, in an area corresponding to a pixel region of the touch panel.

7. The antenna built-in touch panel according to claim 1, further comprising a control circuit that is connected to the common lines, the control circuit supplying a signal for driving the electrodes of the touch panel when the switch is switched to ON, and supplying a signal for driving the antenna pattern when the switch is switched to OFF.

8. The antenna built-in touch panel according to claim 1, wherein the antenna is a metal mesh.

* * * * *